US010263775B2

(12) United States Patent
Setty et al.

(10) Patent No.: US 10,263,775 B2
(45) Date of Patent: Apr. 16, 2019

(54) POLICY-BASED KEY RECOVERY

(71) Applicant: Microsoft Technology Licensing, LLC, Redmond, WA (US)

(72) Inventors: Srinath Tumkur Venkatacha Setty, Redmond, WA (US); Ramarathnam Venkatesan, Redmond, WA (US); Brant Lee Zwiefel, Mill Creek, WA (US); Nishanth Chandran, Bangalore (IN); Satyanarayana V. Lokam, Bangalore (IN); Jonathan David Lee, Berkeley, CA (US); Sharmila Deva Selvis, Chennai (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 105 days.

(21) Appl. No.: 15/631,563

(22) Filed: Jun. 23, 2017

(65) Prior Publication Data

US 2018/0375653 A1    Dec. 27, 2018

(51) Int. Cl.
*H04L 9/00* (2006.01)
*H04L 9/08* (2006.01)
(Continued)

(52) U.S. Cl.
CPC .......... *H04L 9/0894* (2013.01); *H04L 9/3247* (2013.01); *H04L 63/0435* (2013.01);
(Continued)

(58) Field of Classification Search
CPC ..... H04L 9/0894; H04L 9/3247; H04L 63/20; H04L 63/0435; H04L 63/061; H04L 63/0442
(Continued)

(56) References Cited

U.S. PATENT DOCUMENTS 7,181,017 B1   2/2007   Nagel et al.
9,219,730 B2   12/2015  D'Souza
(Continued)

OTHER PUBLICATIONS

D'Souza, et al., "Publicly Verifiable Secret Sharing for Cloud-based Key Management", In Proceedings of the 12th International conference on Cryptology in India, Dec. 11, 2011, 20 pages.
(Continued)

*Primary Examiner* — Aravind K Moorthy
(74) *Attorney, Agent, or Firm* — Schwegman Lundberg & Woessner, P.A.

(57) ABSTRACT

A device establishes a key recovery policy and generates a key that is protected based on the key recovery policy. The key recovery policy indicates which combinations of other entities can recover the protected key. The device generates different shares of the protected key, each share being a value that, in combination with the other share(s), allows the protected key to be recovered. Each share is associated with a particular leaf agent, the device encrypts each share with the public key of the leaf agent associated with the share and provides the encrypted share to a service. When recovery of the protected key is desired, a recovering authority can generate the protected key only if the recovering authority receives decrypted shares from a sufficient one or combination of leaf agents as indicated by the recovery policy.

20 Claims, 7 Drawing Sheets

(51) Int. Cl.
*H04L 9/32* (2006.01)
*H04L 29/06* (2006.01)

(52) U.S. Cl.
CPC ........ *H04L 63/0442* (2013.01); *H04L 63/061* (2013.01); *H04L 63/20* (2013.01)

(58) Field of Classification Search
USPC .................. 713/171; 380/262, 278, 282, 44
See application file for complete search history.

(56) References Cited

U.S. PATENT DOCUMENTS

| | | | |
|---|---|---|---|
| 9,350,536 B2 | 5/2016 | Sabin | |
| 9,390,228 B2 | 7/2016 | Reid | |
| 2004/0030932 A1 | 2/2004 | Juels et al. | |
| 2006/0161791 A1* | 7/2006 | Bennett | G06F 12/1408 713/193 |
| 2008/0123854 A1 | 5/2008 | Peel et al. | |
| 2012/0321086 A1 | 12/2012 | D'Souza et al. | |
| 2014/0164776 A1 | 6/2014 | Hook et al. | |
| 2014/0351586 A1 | 11/2014 | Hook et al. | |
| 2015/0365385 A1 | 12/2015 | Hore | |
| 2016/0154973 A1 | 6/2016 | Ingalls et al. | |
| 2016/0337124 A1* | 11/2016 | Rozman | H04L 9/085 |
| 2017/0222805 A1* | 8/2017 | Telford | H04L 9/0822 |

OTHER PUBLICATIONS

Huang, et al., "YI Cloud : Improving user privacy with secret key recovery in cloud storage", In Proceedings of the 6th IEEE International Symposium on Service Oriented System Engineering, Dec. 12, 2011, pp. 268-272.

Fleming, John, "Unlocking Encryption Key Management", Published on: Apr. 22, 2016 Available at: https://www.echoworx.com/protect-sensitive-information/encryption-key-management-biggest-pain-most-vital/.

* cited by examiner

POLICY-BASED KEY RECOVERY

BACKGROUND

Computers have become increasingly commonplace in our lives and are used in many different ways throughout our days. One such use is to protect data that users desire to keep secure. One way to keep data secure is to encrypt the data, but current encryption techniques can introduce additional problems. For example, a user may desire not to divulge his or her decryption key to anyone else, but this can leave the user unable to recover his or her data if he or she forgets or loses the decryption key. By way of another example, a government or law enforcement agency may require access to encrypted data, yet may not have access to the user's decryption key. These problems can lead to user frustration with their computers when protecting data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a key recovery policy for a protected key is obtained, the key recovery policy specifying a set of possible combinations of multiple leaf agents that can assist in recovering the protected key. Based on the key recovery policy, multiple key shares of the protected key are generated, and ones of the multiple key shares are associated with ones of the multiple leaf agents based at least in part on the key recovery policy. Each of the multiple shares of the key is encrypted with a public key of a public/private key pair of the leaf agent with which the key share is associated, and the encrypted key shares are sent to a service for storage.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
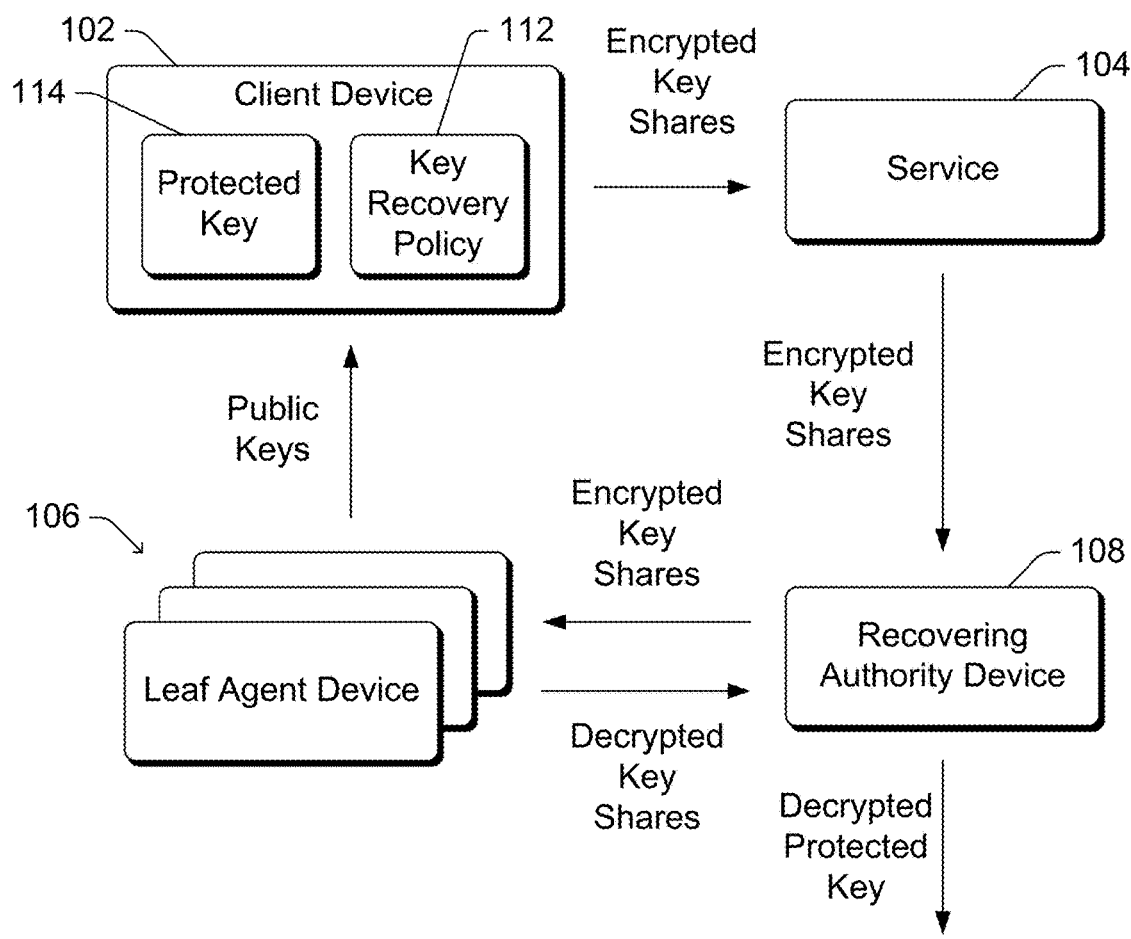
FIG. 1 illustrates an example system implementing the policy-based key recovery in accordance with one or more embodiments.

Policy-based key recovery is discussed herein. A client device establishes a key recovery policy and generates a key that is protected based on the key recovery policy. The protected key can be used in various different manners, such as to encrypt data that the user of the client device desires to keep secret. The key recovery policy indicates which other entities or which combinations of other entities can recover the protected key. These entities that can be used to recover the protected key are also referred to herein as leaf agents. Each leaf agent has an associated public/private key pair, and makes its public key available to the client device.

The client device generates different shares of the protected key, such as one share for each leaf agent. Different leaf agents can have the same or different shares depending on the key recovery policy. A share of the protected key refers to a value that, in combination with the other share(s), allows the protected key to be recovered. For example, the protected key can be a number and two other arbitrary numbers can be selected that have a sum that is the protected key. Each of these two other arbitrary numbers can be a share of the protected key. Each share is associated with a particular leaf agent, and the client device encrypts each share with the public key of the leaf agent associated with the share.

When recovery of the protected key is desired, a recovering authority has one or more leaf agents decrypt their encrypted shares. Each leaf agent can decrypt its associated encrypted share using the private key of the leaf agent. The leaf agent(s) return the decrypted shares to the recovering authority, which uses the share to generate the protected key. The recovering authority can generate the protected key only if the recovering authority receives decrypted shares from a sufficient one or combination of leaf agents as indicated by the recovery policy. Furthermore, each leaf agent will decrypt the encrypted share only if the leaf agent believes that it is appropriate for the recovering authority to recover the protected key. For example, the leaf agent may be a computing device of a law enforcement agency, and the leaf agent may decrypt the encrypted share only if the law enforcement agency has received a court order authorized decryption of the encrypted share.

The client device also optionally generates a proof that the encrypted shares from each appropriate one or combination of leaf agents (as indicated by the recovery policy) can indeed be used to recover the protected key. These proofs are generated as non-interactive zero-knowledge proofs that can be verified by the recovering authority without having access to the decrypted shares.

The techniques discussed herein provide enhanced security for computing devices by keeping a protected key secure. Despite keeping the protected key secure, the recovery policy allows the protected key to be recovered by an appropriate one or combination of other devices. Thus, for example, if the user loses the protected key and needs to recover the protected key, the appropriate one or combination of other devices as indicated by the recovery policy can be used to recover the protected key. By way of another example, if a law enforcement agency desires access to the protected key, the appropriate one or combination of other devices as indicated by the recovery policy can be used to recover the protected key.

References are made herein to symmetric key cryptography, public key cryptography and public/private key pairs. Although such key cryptography is well-known to those skilled in the art, a brief overview of such cryptography is included here to assist the reader. In public key cryptography, an entity (such as a user, hardware or software component, a device, a domain, and so forth) has associated with it a public/private key pair. The public key can be made publicly available, but the entity keeps the private key a secret. Without the private key it is computationally very difficult to decrypt data that is encrypted using the public key. So, data can be encrypted by any entity with the public key and only decrypted by an entity with the corresponding private key. Additionally, a digital signature for data can be generated by using the data and the private key. Without the private key it is computationally very difficult to create a signature that can be verified using the public key. Any entity with the public key can use the public key to verify the digital signature by executing a suitable digital signature verification algorithm on the public key, the signature, and the data that was signed.

In symmetric key cryptography, on the other hand, a shared key (also referred to as a symmetric key) is known by and kept secret by the two entities. Any entity having the shared key is typically able to decrypt data encrypted with that shared key. Without the shared key it is computationally very difficult to decrypt data that is encrypted with the shared key. So, if two entities both know the shared key, each can encrypt data that can be decrypted by the other, but other entities cannot decrypt the data if the other entities do not know the shared key. Similarly, an entity with a shared key can encrypt data that can be decrypted by that same entity, but other entities cannot decrypt the data if the other entities do not know the shared key. Additionally, digital signatures can be generated based on symmetric key cryptography, such as using a keyed-hash message authentication code mechanism. Any entity with the shared key can generate and verify the digital signature. For example, a trusted third party can generate a symmetric key based on an identity of a particular entity, and then can both generate and verify digital signatures for that particular entity (e.g., by encrypting or decrypting the data using the symmetric key).

FIG. 1 illustrates an example system 100 implementing the policy-based key recovery in accordance with one or more embodiments. System 100 includes a client device 102, a service 104, one or more leaf agent devices 106, and a recovering authority device 108. The client device 102 is associated with a client (e.g., a user, organization, etc.) that desires to protect information (e.g., data, programs, communications channels, etc.) using a key that is protected based on a key recovery policy 112. This key is referred to as the protected key 114.

The client device 102 can be a variety of different types of devices, such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet, augmented reality (AR) device, virtual reality (VR) device), an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, an automotive computer, and so forth. Thus, client device 102 may range from a full-resource device with substantial memory and processor resources (e.g., personal computers, game consoles) to a low-resource device with limited memory and/or processing resources (e.g., traditional set-top boxes, handheld game consoles).

The service 104 is a storage or escrow service that stores or otherwise maintains encrypted key shares. The encrypted key shares are encrypted shares of the protected key 114, as discussed in more detail below. In one or more embodiments, the service 104 is implemented using one or more server computers. Additionally or alternatively, the service 104 can be implemented using any of a variety of different types of computing devices analogous to the client device 100, ranging from full-resource devices to low-resource devices.

Each leaf agent device 106 is associated with a leaf agent. A leaf agent refers to an entity (e.g., person, organization, company, government agency, etc.) that can by itself and/or in combination with one or more other entities recover the protected key 114. Each leaf agent device 106 can be implemented using any of a variety of different types of computing devices analogous to the client device 100, ranging from full-resource devices to low-resource devices.

The recovering authority device 108 is associated with a recovering authority. The recovering authority refers to an entity (e.g., person, organization, company, government agency, etc.) that is trusted or able to decrypt the protected recovery key 114. The recovering authority device can be implemented using any of a variety of different types of computing devices analogous to the client device 100, ranging from full-resource devices to low-resource devices.

Different ones of the client device 102, the service 104, the leaf agent devices 106, and the recovering authority device 108 can communicate with one another via any of a variety of different connections. For example, various ones of the client device 102, the service 104, the leaf agent devices 106, and the recovering authority device 108 can be connected to one another via a wired or wireless connection, such as a USB (universal serial bus) connection, a wireless USB connection, an infrared connection, a Bluetooth connection, a DisplayPort connection, a PCI (a peripheral component interconnect) Express connection, and so forth. Various ones of the client device 102, the service 104, the leaf agent devices 106, and the recovering authority device 108 can alternatively or additionally be connected to one another via a data network, such as the Internet, a local area network (LAN), a public telephone network, an intranet, other public and/or proprietary networks, combinations thereof, and so forth.

The protected key 114 can be generated by the client device 102 and/or obtained from another device or service (e.g., a trusted key generation service accessible to the client device 102). The key recovery policy 112 indicates which other entities or which combinations of other entities can recover the protected key 114. Each of these entities is a leaf agent associated with one of the leaf agent devices 106. The key recovery policy 112 can be created by a user or administrator of the client device 102, by an employer or manager of an organization that owns the client device 102, by a governmental entity, and so forth. In one or more embodiments, the key recovery policy 112 indicates different combinations of leaf agents that can together recover the protected key 114. These different leaf agents can be combined using various different combinatorial logic, such as logical AND and logical OR operations. This indication of different leaf agents and how they can be combined is also referred to as a policy tree having multiple nodes. Each node of the policy tree is a leaf agent or combination of leaf agents, as discussed in more detail below. The policy tree reflects or represents the combinations of leaf agents that can together recover the protected key 114.

For example, the key recovery policy 112 may specify that a particular law enforcement agency with an order from a particular court system can recover the protected key 114, in which case both the particular law enforcement agency and the particular court system are leaf agents. The key recovery policy 112 may also specify that a key recovery department of an organization of which the client device 102 is a part can recover the protected key 114, in which case the key recovery department of the organization is a leaf agent. The key recovery policy 112 may also specify that either a lawyer or an accountant of the user of the client device 102, along with any two or more of three different children of the user of the client device 102 can recover the protected key 114, in which case the lawyer, the accountant, and each of the three different children are leaf agents.

The client device 102 creates multiple shares of the protected key 114 for the leaf agents such that shares from the combination(s) of leaf agents specified in the key recovery policy 112 can be used to recover the protected key 114. Some leaf agents can be given the same share, whereas other leaf agents are given different shares. The generation of shares for the various leaf agents is discussed in more detail below.

The client device 102 also obtains public keys from the leaf agent devices 106. For each share to be associated with a leaf agent device 106, the client device 102 encrypts the share with the public key of the leaf agent device 106. The share is then communicated to the service 104, which stores or otherwise maintains the share in any of a variety of different manners. For example, the service 104 can store the share in a storage device (e.g., solid state drive, magnetic drive, etc.) of the service 104. The service 104 typically stores, but need not store, the shares in encrypted form.

At some later time a recovering authority desires to recover the protected key 114. For example, the client device 102 user's lawyer and a child may desire to recover the key recovery policy 112 because the user is incapacitated. The recovering authority device 108 associated with the recovering authority obtains the encrypted shares from the service 104. The recovering authority device 108 provides the encrypted shares to the appropriate leaf agent devices 106. A leaf agent device 106 can use its private key to decrypt a share that was encrypted by the client device 102 using the public key of the leaf agent device 106. The leaf agent device 106 decrypts the encrypted share and returns the decrypted share to the recovering authority device 108 only if the leaf agent device 106 believes it is appropriate to do so. E.g., continuing with the previous example, a share associated with the user's lawyer is provided to the leaf agent device 106 associated with the user's lawyer (e.g., the lawyer's smartphone or laptop computer), and that leaf agent device 106 decrypts the share only if the user's lawyer provides input to the leaf agent device 106 indicating it is acceptable to do so. Similarly, a share associated with the user's child is provided to the leaf agent device 106 associated with the user's child (e.g., the child's smartphone or laptop computer), and that leaf agent device 106 decrypts the share only if the user's child provides input to the leaf agent device 106 indicating it is acceptable to do so.

The recovering authority device 108 receives the decrypted shares from the leaf agent devices 106, and combines the shares to generate the protected key 114. This generation is also referred to as recovering the protected key 114. However, if at least one leaf agent device 106 does not believe it is appropriate to decrypt its share, then the recovering authority device 108 will not have all of the decrypted shares and will be unable to generate the protected key 114.

Figure 2:
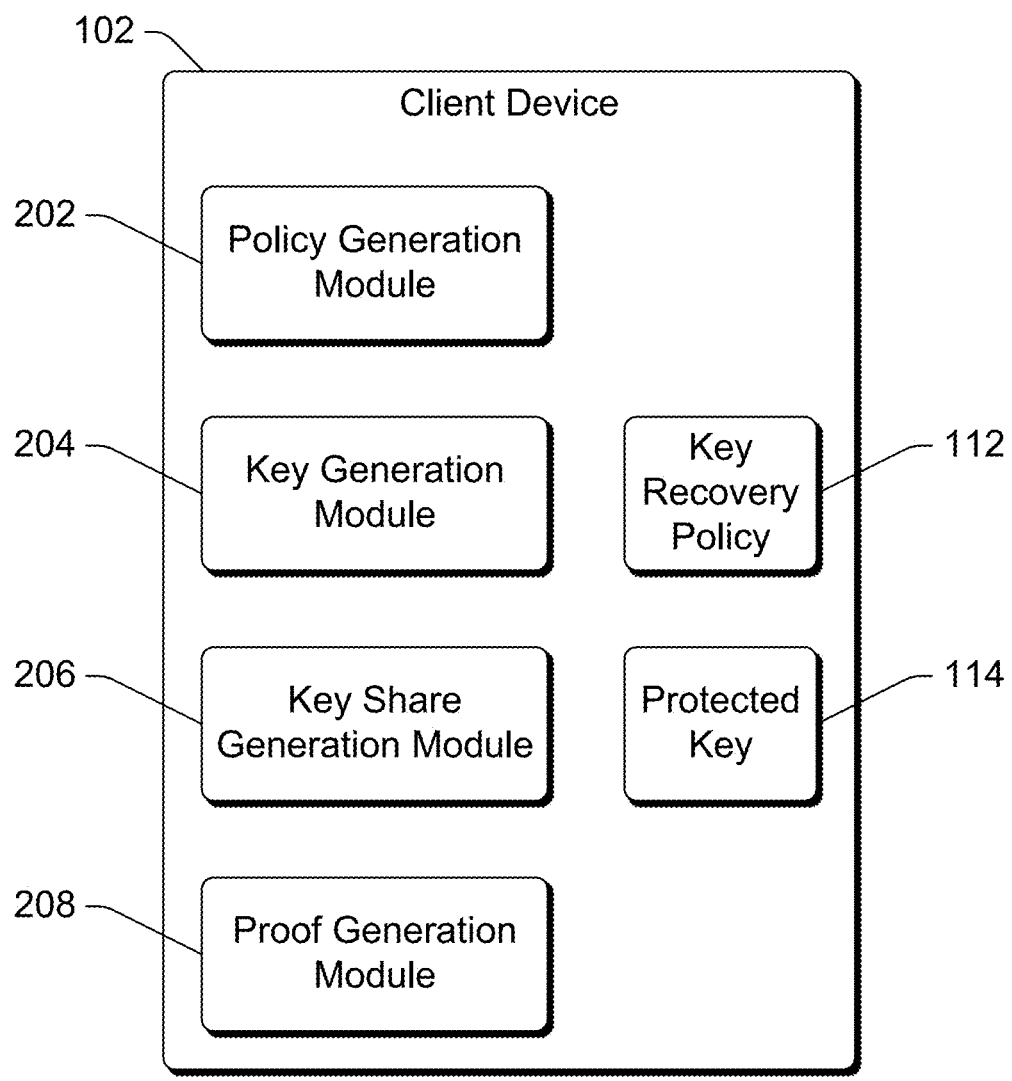
FIG. 2 illustrates an example client device in accordance with one or more embodiments.

FIG. 2 illustrates an example client device 102 in accordance with one or more embodiments. The client device 102 includes the protected key 114 and the key recovery policy 112. The client device 102 also includes a policy generation module 202, a key generation module 204, a key share generation module 206, and a proof generation module 208.

Policy generation module 202 generates or otherwise obtains the key recovery policy 112. The policy generation module 202 can generate the key recovery policy 112 generated based on user inputs received at the client device 102, can retrieve or otherwise obtain the key recovery policy 112 from another device or service, and so forth as discussed above.

Key generation module 204 generates or otherwise obtains the protected key 114. The key generation module 204 can employ any of a variety of public and/or proprietary techniques to generate the protected key 114, can retrieve or otherwise obtain the protected key 114 from another device or service, and so forth as discussed above.

Proof generation module 208 generates a proof that the encrypted shares from each appropriate one or combination of leaf agents (as indicated by the key recovery policy 112) can indeed be used to recover the protected key 114. The proof generation can be performed without having knowledge of the values of the individual decrypted shares, as discussed in more detail below.

Key share generation module 206 generates the key shares for the leaf agents. The key share generation module 206 determines how many shares to generates based on the key recovery policy 112. The key share generation module 206 generates multiple (e.g., two) key shares from the protected key 114 by generating multiple (e.g., two) numbers that, when used in a mathematical formula, generate the protected key 114. These multiple numbers are the multiple key shares, and the multiple numbers can be generated using any of a variety of public and/or proprietary techniques, such as generation of random or pseudo random numbers. The mathematical formula can be a single operation (e.g., multiplication) or alternatively any two or more mathematical operations. For example, the key share generation module 206 can generate two shares from the protected key 114 by generating two numbers that, when multiplied together, result in a product that is the protected key 114. Similarly, the key share generation module 206 can generate multiple (e.g., two) key shares from a previously generated key share by generating multiple (e.g., two) numbers that, when used in a mathematical formula, generate the previously generated key share.

In one or more embodiments, the techniques discussed herein employ the decisional Diffie-Hellman (DDH) assumption, which is an assumption regarding problems solving discrete logarithms in cyclic groups. The DDH assumption is used as the basis for the techniques discussed herein.

Figure 3:
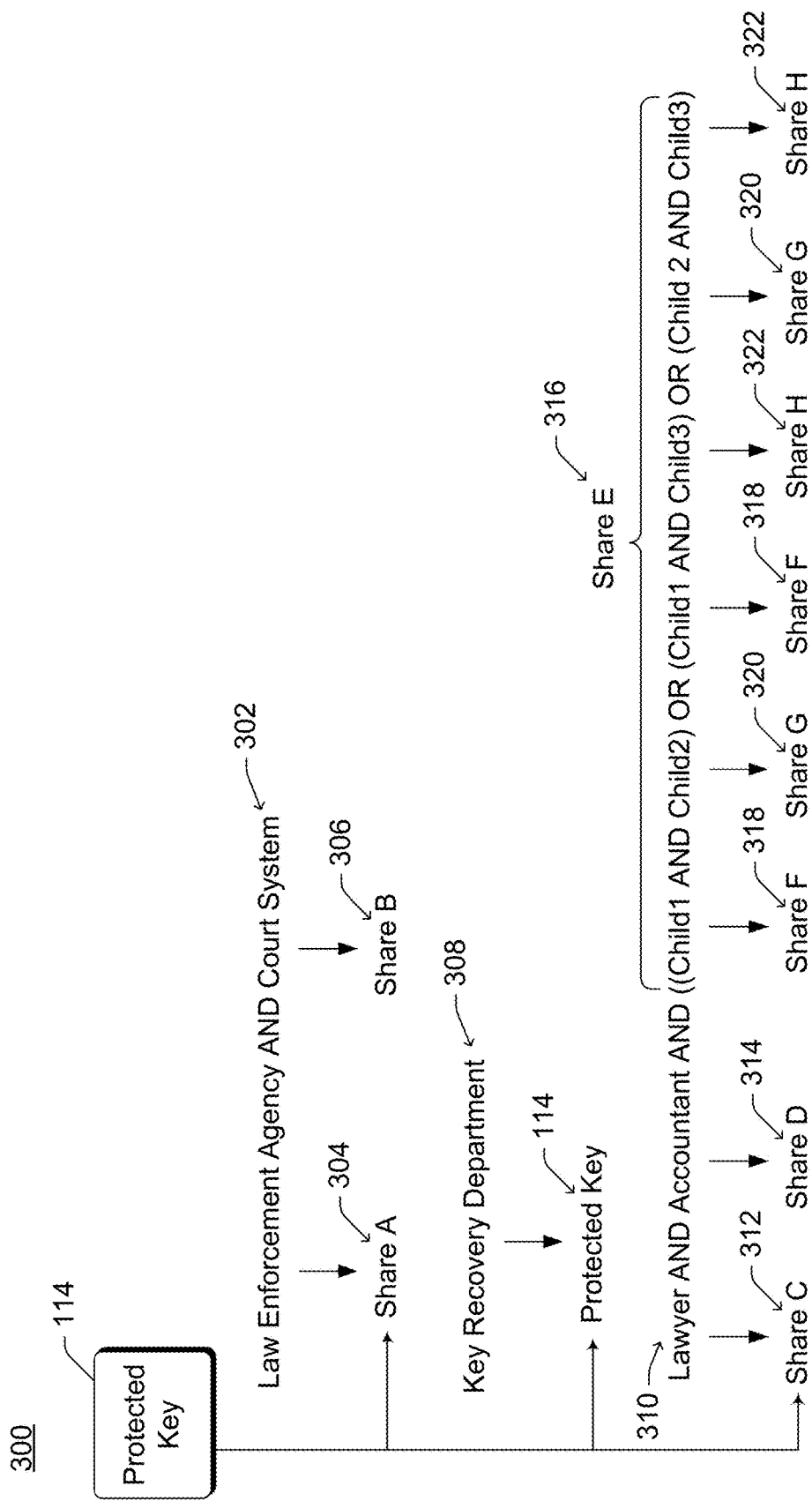
FIG. 3 illustrates an example of generating key shares based on a key recovery policy.

FIG. 3 illustrates an example 300 of generating key shares based on the key recovery policy 112. FIG. 3 shows a protected key 114 and, based on the key recovery policy, multiple different combinations of leaf agents that can recover the protected key 114. One combination of leaf agents shown at 302 as a law enforcement agency and a court system. Two shares 304 and 306 are generated from the protected key 114, with share 304 being provided to the law enforcement agency leaf agent and share 306 being provided to the court system leaf agent.

Another leaf agent is shown at 308 as a key recovery department of an organization. The key recovery department can recover the protected key 114 without other leaf agents, and thus rather than being a share the key recovery department leaf agent has the protected key 114.

Another combination of leaf agents is shown at 310 as a lawyer, an accountant, and each of three different children (e.g., of the user of the client device). Three shares 312, 314, and 316 are generated from the protected key 114, with share 312 being provided to the lawyer leaf agent and share 314 being provided to the accountant leaf agent. Three additional shares 318, 320, and 322 are generated from the share 316, with share 318 being provided to a first of the three children that is a leaf agent, share 320 being provided to a second of the three children that is a leaf agent, and share 322 being provided to a third of the three children that is a leaf agent.

As can be seen from the example 300, in generating shares, for each logical AND in the combination of leaf agents multiple key shares are generated from either the protected key 114 or a previously generated key share (e.g., share 316). And, for each logical OR in the combination of leaf agents the protected key 114 or the previously generated key share is simply passed through to the leaf agents.

Given these logical combinations, it can be readily seen that the protected key 114 can be recovered by the various combinations of leaf agents specified in the key recovery policy. However, any invalid combination of leaf agents is not able to recover the protected key 114. For example, if the user's lawyer and accountant attempted to recover the protected key 114 without any of the three children, there would be insufficient decrypted key shares available to be able to recover the protected key 114.

The example 300 also corresponds to a policy tree for recovery of the protected key 114, which is the root of the policy tree. The leaf agents shown at 302 together as a group can be logically OR'd with the leaf agent shown at 308 as well as the leaf agents shown at 310 together as a group. Thus, any one or more of the leaf agent 308 or the combinations of leaf agents shown at 302 and 310 can be used to recover the protected key 114. The policy tree is made up of multiple nodes that can be leaves (e.g., the law enforcement agency leaf, the court system leaf), and internal nodes that are made up of a combination of leaves (e.g., a node corresponding to share 316, which is made up of various combinations of the child 1 leaf, the child 2 leaf, and the child 3 leaf).

Figure 4:
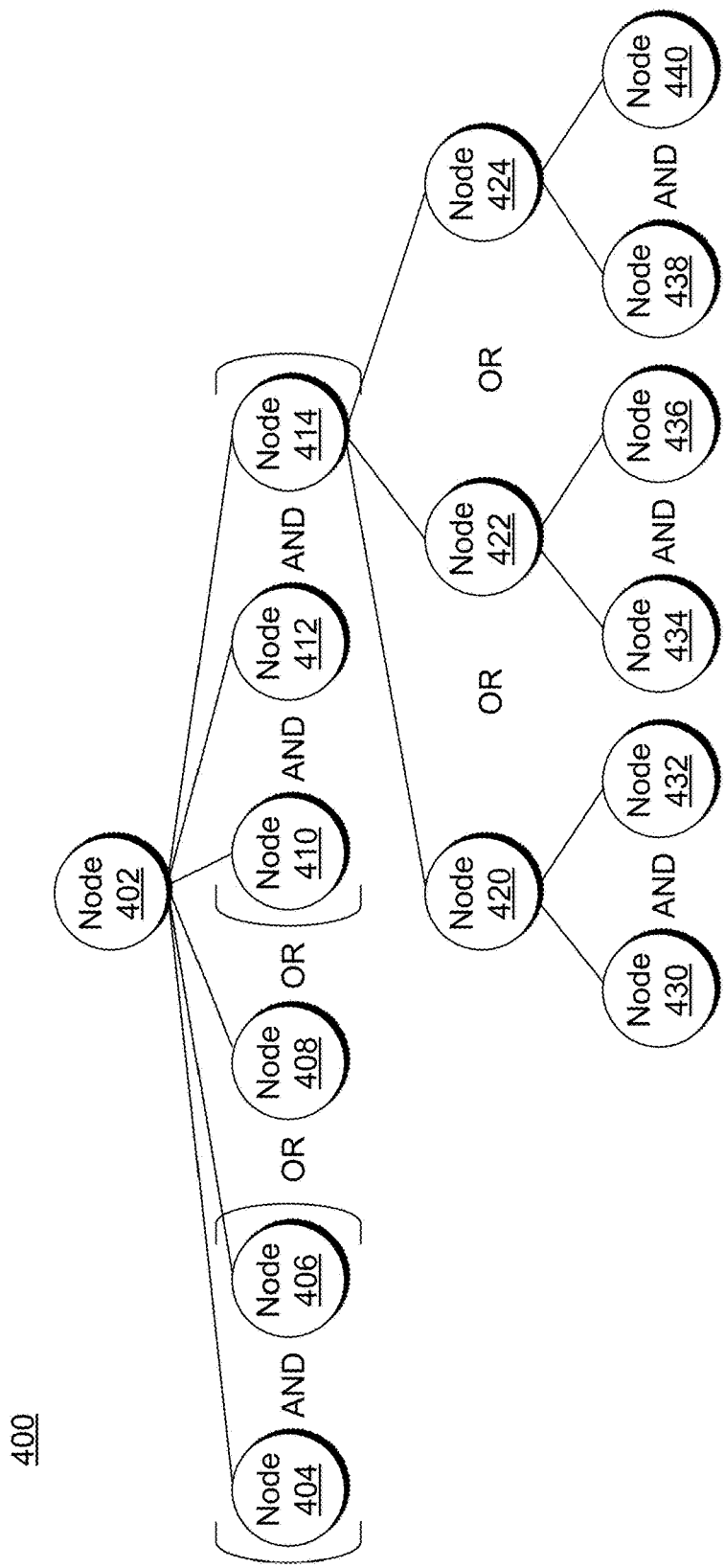
FIG. 4 illustrates an example policy tree in accordance with one or more embodiments.

FIG. 4 illustrates an example policy tree 400 in accordance with one or more embodiments. The policy tree 400 includes multiple nodes, including a node 402 that is the root node. The policy tree is discussed with additional reference to elements of FIG. 3. The node 402 corresponds to, for example, protected key 114.

Five leaf nodes 404, 406, 408, 410, and 412, and one internal node 414, are below the node 402. The leaf node 404 corresponds to the law enforcement agency in FIG. 3 and the leaf node 406 corresponds to the court system in FIG. 3, and leaf nodes 404 and 406 are combined using an OR gate (also referred to as a logical OR operation). The leaf node 408 corresponds to the key recovery department in FIG. 3. The leaf node 410 corresponds to the lawyer in FIG. 3 and the leaf node 412 corresponds to the accountant in FIG. 3. The internal node 414 corresponds to the collection of various combinations of the child 1 leaf, the child 2 leaf, and the child 3 leaf, which is associated with share 316 of FIG. 3. The leaf node 410, leaf node 412, and internal node 414 are combined using an AND gate (also referred to as a logical AND operation) Similarly, the combination of A) nodes 404 and 406, B) node 408, and C) nodes 410, 412, and 414 are combined using OR gates.

Three internal nodes 420, 422, and 424 are below the internal node 414. The internal node 420 corresponds to the combination of the child 1 leaf and the child 2 leaf (Child1 AND Child2) shown in FIG. 3. The internal node 422 corresponds to the combination of the child 1 leaf and the child 3 leaf (Child1 AND Child3) shown in FIG. 3. The internal node 424 corresponds to the combination of the child 2 leaf and the child 3 leaf (Child2 AND Child3) shown in FIG. 3. The internal nodes 420, 422, and 424 are combined using OR gates.

Below each of the internal nodes 420, 422, and 424 is two leaf nodes, shown as leaf nodes 430 and 432, leaf nodes 434 and 436, and leaf nodes 438 and 440, respectively. The leaf nodes 430 and 434 both correspond to the child 1 leaf (Child1) shown in FIG. 3. The leaf nodes 432 and 438 both correspond to the child 2 leaf (Child2) shown in FIG. 3. The leaf nodes 436 and 440 both correspond to the child 3 leaf (Child3) shown in FIG. 3. The leaf nodes 430 and 432 are combined using an AND gate, the leaf nodes 434 and 436 are combined using an AND gate, and the leaf nodes 438 and 440 are combined using an AND gate.

Returning to FIG. 2, the key share generation module 206 can generate the key shares for the protected key 114 in any of a variety of different manners. Table I below illustrates an example of generating the key shares for the protected key 114. Although a particular algorithm is illustrated in Table I, it should be noted that the algorithm shown in Table I is only an example and that various other algorithms can alternatively be used to generate the key shares for the protected key 114.

TABLE I

| Line | Description |
| --- | --- |
| 1 | procedure Share(v, $K_v$) |
| 2 | if v is a leaf then |
| 3 | share(v) := $K_v$ |
| 4 | else if v is an internal node computing AND with children $v_1$ and $v_2$ then |
| 5 | Choose random $K_1$ from G |
| 6 | Let $K_2 := K_v \cdot (1 \div K_1)$ |
| 7 | Share($v_1$, $K_1$) |
| 8 | Share($v_2$, $K_2$) |
| 9 | else if v is an internal node computing OR with children $v_1$ and $v_2$ then |
| 10 | $K_1 := K_v$ ; $K_2 := K_v$ |
| 11 | Share($v_1$, $K_1$) |
| 12 | Share($v_2$, $K_2$) |
| 13 | end if |
| 14 | end procedure |
| 15 | Share(root) |

A policy tree P is specified by the key recovery policy 112 and has internal nodes labeled by AND or OR gates and the leaves are labeled as the leaf agents. Accordingly, a leaf of the policy tree P is a leaf agent that will obtain a key share of the protected key 114. The procedure Share shown in Table I generates the shares of the leaf agents starting with the protected key K. At every AND gate the current secret (protected key or key share) is written as the product of two random numbers at its children, and at every OR gate the current secret (protected key or key share) is propagated to its children. This is done recursively until the shares of the leaf agents are reached.

The procedure Share starts at line 1, and generates key shares of $K_v$ for the subtree rooted at v. The procedure Share is invoked at line 15 with the protected key 114, shown as root in Table I, is $K_v$, and v is the root of the policy tree P.

At line 2, a check is made as to whether v is a leaf of the policy tree P. At line 3, if v is a leaf of the policy tree P, then a key share for v is set equal to $K_v$.

At line 4, if v is an internal node (not a leaf node) with children $v_1$ and $v_2$ logically AND'd, then at line 5 a number $K_1$ is randomly (e.g., pseudorandomly) chosen from the group G. At line 6 a number $K_2$ is generated such that $K_v = K_1 \cdot K_2$. At line 7, the procedure Share is called to recursively generate key shares for $K_1$ for the subtree rooted at $v_1$. At line 8, the procedure Share is called to recursively generate key shares for $K_2$ for the subtree rooted at $v_2$.

At line 9, if v is an internal node (not a leaf node) with children $v_1$ and $v_2$ logically OR'd, then at line 10, $K_1$ is set equal to $K_v$ and $K_2$ is set equal to $K_v$ so the children $v_1$ and $v_2$ get the same key share as the parent node in the policy tree P. At line 11, the procedure Share is called to recursively generate key shares for $K_1$ for the subtree rooted at $v_1$. At line 12, the procedure Share is called to recursively generate key shares for $K_2$ for the subtree rooted at $v_2$.

At lines 13 and 14, the procedure Share ends.

It should be noted that although the example in Table I splits key shares at a logical AND multiplicatively, other mathematical formulas can be used. For example, the key shares can be split additively.

Returning to FIG. 1, the recovering authority device 108 can recover the protected key 114 from the decrypted key shares for the protected key 114 in any of a variety of different manners, dependent at least in part on the manner in which the key shares were generated. The recovery authority device 108 is aware of the manner in which the key shares for the protected key 114 are generated, and thus is able to recover the protected key 114 from an appropriate combination of decrypted key shares (in accordance with the key recovery policy 112). Table II below illustrates an example of recover the protected key 114 from the key shares. Although a particular algorithm is illustrated in Table II, it should be noted that the algorithm shown in Table II is only an example and that various other algorithms can alternatively be used to recover the protected key 114 from the key shares.

TABLE II

| Line | Description |
|---|---|
| 1 | function Recover(v) |
| 2 | if v is a leaf then |
| 3 | return share at v |
| 4 | else if v is an internal node computing AND with children $v_1$ and $v_2$ then |
| 5 | $K_1$ := Recover($v_1$) ; $K_2$ := Recover($v_2$) |
| 6 | return ($K_1 \cdot K_2$) |
| 7 | else if v is an internal node computing OR with children $v_1$ and $v_2$ then |
| 8 | $K_1$ := Recover($v_1$) ; $K_2$ := Recover($v_2$) |
| 9 | if $K_1 \neq 0$ then |
| 10 | return $K_1$ |
| 11 | else if $K_2 \neq 0$ then |
| 12 | return $K_2$ |
| 13 | else |
| 14 | return 0 |
| 15 | end if |
| 16 | end if |
| 17 | end function |
| 18 | R:=Recover(root) |

The function Recover shown in Table II starts at line 1, and returns the protected key 114 if the policy P is satisfied. If the policy P is not satisfied, a value of 0 is returned. The function Recover is invoked at line 18 with the root of the policy tree P shown as root in Table II.

At line 2, a check is made as to whether v is a leaf of the policy tree P. At line 3, if v is a leaf of the policy tree P, then a decrypted key share at v is returned. The decrypted key share at v is set equal to $K_v$ if the leaf agent associated with the key share provides the decrypted key share. If the leaf agent associated with the key share does not provide the decrypted key share, then the share at v is set equal to 0.

At line 4, if v is an internal node (not a leaf node) with children $v_1$ and $v_2$ logically AND'd, then at line 5 the function Recover is called to recursively recover decrypted key shares for $K_1$ for the subtree rooted at $v_1$, and the function Recover is called to recursively recover decrypted key shares for $K_2$ for the subtree rooted at $v_2$. At line 6, the value of $K_1 \cdot K_2$ is returned. It should be noted that if the recursive calls at line 5 do not result in decrypted key shares being provided by the leaf agents, the value returned at line 6 will be 0.

At line 7, if v is an internal node (not a leaf node) with children $v_1$ and $v_2$ logically OR'd, then at line 8 the function Recover is called to recursively recover decrypted key shares for $K_1$ for the subtree rooted at $v_1$, and the function Recover is called to recursively recover decrypted key shares for $K_2$ for the subtree rooted at $v_2$. At lines 9 and 10, if the recursive call(s) at line 8 for $K_1$ result in a decrypted key share being provided by a leaf agent (in which case $K_1$ is not equal to 0), then the decrypted key share $K_1$ that is returned by the recursive call(s) at line 8 for $K_1$ is returned at line 10. At lines 11 and 12, if the recursive call(s) at line 8 for $K_2$ result in a decrypted key share being provided by a leaf agent (in which case $K_2$ is not equal to 0), then the decrypted key share $K_2$ that is returned by the recursive call(s) at line 8 for $K_2$ is returned at line 12. At lines 13 and 14, if the recursive calls at line 8 for $K_1$ and $K_2$ both result in values of 0, then the value 0 is returned at line 14.

At lines 15-17, the function Recover ends.

It should be noted that although the example in Table II assumes key shares were split at a logical AND multiplicatively, other mathematical formulas can be used. For example, the key shares can have been split additively, in which case the value returned at line 6 is $K_1 + K_2$ if $K_1$ and $K_2$ are both non-zero, and is 0 if either $K_1$ or $K_2$ is 0.

The algorithms discussed in Table I and Table II assume that each node of the policy tree P can be a leaf node or can have two children nodes. However, it should be noted that a node that is not a leaf node can alternatively have three or more children nodes that are treated analogously to the two children nodes.

Returning to FIG. 2, the client device 102 also includes a proof generation module 208. The proof generation module 208 generates a proof (also referred to as a guarantee) that each collection of leaf agents that is to be able to recover the protected key 114 (as indicated by the key recovery policy 112) can indeed recover the protected key 114. The proof generation module 208 uses non-interactive zero-knowledge proofs (NIZK) to prove that multiple collections of key shares that are supposed to recover the same protected key 114 do, in fact, recover the same protected key 114. Furthermore, the proof generation module 208 generates such proofs using the encrypted key shares, thus not requiring the decrypted key shares to be revealed. Thus, the service 104 is assured that each collection of leaf agents that should be able to recover the protected key 114 can indeed recover the protected key 114 without having knowledge of the protected key 114 or the decrypted key shares that can be used to recover the protected key 114.

The proof generation module 208 can generate these proofs in a variety of different manners. The proof generation module 208 assumes that the group of numbers from which the key shares are chosen (the group G in Table I) is cyclic of order q and is generated by a generator g that is known to at least the client device 102 and the service 104. The proof generation module 208 also assumes that the Discrete Logarithm (DL) problem and related problems such as DDH (Decisional Diffie-Hellman) are computationally intractable in the group of numbers form which the key shares are chosen.

In the following discussions, two different schemes for generating these proofs are discussed. The first scheme uses one less NIZK proof per OR gate in the policy tree, but uses correlated randomness at OR gates in the policy tree. The first scheme is discussed below with reference to Table III, Table IV, and Table V. The second scheme avoids the need to have correlated randomness but uses an additional NIZK proof per OR gate. The second scheme uses uncorrelated randomness by fixing a child of each OR gate to propagate the encryption. The randomness among the children of the OR gate can then be chosen independently. The second scheme is discussed below with reference to Table III, Table X, and Table XI.

Discussing the first scheme using correlated randomness at OR gates in the policy tree, the proof generation module 208 has a public/private key pair. This public/private key pair is discussed below as S (upper case) for the public key and s (lower case) for the private key. This public/private key pair and be a public/private key pair of the client device 102, or a public/private key pair for just the proof generation module 208. The proof generation module 208 also has access to a function sig=Sign(s, message) that generates a digital signature sig using the private key s for any data given as message, and a function CheckSign(S, sig, message) that verifies a digital signature sig using the public key S for any data given as message. The Sign and CheckSign functions can be implemented on the client device 102 or alternatively on another device or service.

In the discussions of the first scheme below, it is assumed that the shares of a protected key K have been generated according to the policy tree P. For each leaf $\lambda$ (which can also be referred to as the leaf agent or leaf node in the policy tree) of the policy tree P, the corresponding share is referred to as $K_\lambda$. The value $X_\lambda$ refers to the public key for the leaf $\lambda$. The secret key $x_\lambda$ is privately held by the leaf $\lambda$ (or device associated with the leaf agent). The proof generation module 208 chooses (randomly or pseudorandomly) a secret y and computes the corresponding public key Y as $Y:=g^y$, The proof generation module 208 also chooses (randomly or pseudorandomly) a value r and computes additive secret shares, and $r_\lambda$ is the key share of r for leaf $\lambda$ of the policy tree P.

When computing the additive secret shares, it is considered that when a secret K is taken from a cyclic group G, generated by an element g, an additive secret sharing scheme can be used by considering the discrete logs with respect to g. Computing the additive secret shares refers to taking a secret that is an integer (e.g., $s \in \mathbb{Z}_q^*$) where G is of order q, such that $K=g^s$. At an AND gate with 'incoming secret' t, a random value $t_1 \in \mathbb{Z}_q^*$ is picked and a let $t_2:=t-t_1$. If $s_v$ is the secret at node v in the additive scheme, then $K_v:=g^v$ is the multiplicative secret at v. Conversely, given an additive secret sharing scheme over $\mathbb{Z}_q^*$, a multiplicative secret sharing scheme can be readily constructed over any cyclic group G of order q by fixing a generator g for G.

Table III below illustrates an example of the encryptions to be used for the proofs for protected key K and policy tree P. Although a particular algorithm is illustrated in Table III, it should be noted that the algorithm shown in Table III is only an example and that various other algorithms can alternatively be used to generate the encryptions to be used for the proofs for protected key K and policy tree P.

TABLE III

| Line | Description |
|---|---|
| 1 | function Encrypt(v) |
| 2 | if v is a leaf $\lambda$ then |
| 3 | Let $r_\lambda$ be as defined above |
| 4 | Compute $U_\lambda := K_\lambda \cdot g^{r_\lambda}$; $V_\lambda := Y^{r_\lambda}$; $W_\lambda := X_\lambda^{r_\lambda}$ |
| 5 | return $C_\lambda := (U_\lambda, V_\lambda, W_\lambda)$ |
| 6 | else if v is an internal node computing AND with children $v_1$ and $v_2$ then |
| 7 | $C_{v_1} := \text{Encrypt}(v_1)$ and $C_{v_2} := \text{Encrypt}(v_2)$ |
| 8 | Compute $U_v := U_{v_1} \cdot U_{v_2}$ and $V_v := V_{v_1} \cdot V_{v_2}$ |
| 9 | Let $C_v := (U_v, V_v)$ |
| 10 | return $C_v \| C_{v_1} \| C_{v_2}$ |
| 11 | else if v is an internal node computing OR with children $v_1$ and $v_2$ then |
| 12 | $C_{v_1} := \text{Encrypt}(v_1)$ and $C_{v_2} := \text{Encrypt}(v_2)$ |
| 13 | Let $C_v := C_{v_1}$ |
| 14 | return $C_v \| C_{v_1} \| C_{v_2}$ |
| 15 | end if |
| 16 | end function |
| 17 | $C_{root} := \text{Encrypt}(\text{root})$ |
| 18 | sig := Sign(s,$C_{root}$) |

The function Encrypt starts at line 1 and generates a ciphertext for every node in the policy tree P. For each leaf $\lambda$, the ciphertext is a triple $C_\lambda:=(U_\lambda, V_\lambda, W_\lambda)$. For each internal node v, the ciphertext is a pair $C_v:=(U_v,V_v)$. The function Encrypt is invoked at line 17 with the node corresponding to protected key 114, shown as root in Table III, and returns an encryption of the policy tree P. After invoking the function Encrypt, at line 18 the resultant encryption of the policy tree P ($C_{root}$) is digitally signed by invoking the function Sign.

For the function Encrypt invoked with a node v, at line 2 a check is made as to whether the current node v is a leaf $\lambda$. If the current node v is a leaf $\lambda$, then the value $r_\lambda$ is defined as discussed above at line 3. The triple $C_\lambda:=(U_\lambda, V_\lambda, W_\lambda)$ is computed and returned at lines 4 and 5.

At line 6, if v is an internal node (not a leaf node) with children $v_1$ and $v_2$ logically AND'd, then at line 7 the function Encrypt is called to recursively generate ciphertext for the subtree rooted at $v_1$ and the subtree rooted at $v_2$. At lines 8 and 9 the value $C_v:=(U_v, V_v)$ is computed. At line 10 the values $C_v$, $C_{v_1}$, and $C_{v_2}$ are returned.

At line 11, if v is an internal node (not a leaf node) with children $v_1$ and $v_2$ logically OR'd, then at line 7 the function Encrypt is called to recursively generate ciphertext for the subtree rooted at $v_1$ and the subtree rooted at $v_2$. At line 13 the value $C_v:=C_{v_1}$ is computed. At line 14 the values $C_v$, $C_{v_1}$, and $C_{v_2}$ are returned At lines 15 and 16 the function Encrypt ends.

Table IV below illustrates an example of generating a proof for a policy tree P. Although a particular algorithm is illustrated in Table IV, it should be noted that the algorithm shown in Table IV is only an example and that various other algorithms can alternatively be used to generate the proofs for policy tree P.

TABLE IV

| Line | Description |
|------|-------------|
| 1 | function Prove(v, $C_v$) |
| 2 | if v is a leaf $\lambda$ then |
| 3 | Let $C_\lambda := (U_\lambda, V_\lambda, W_\lambda)$ be encryption at $\lambda$ |
| 4 | Generate $\Pi_{\lambda,1}$ := PROOF-DL-EQUAL($W_\lambda, X_\lambda, V_\lambda, Y, r_\lambda$) |
| 5 | Generate $\Pi_{\lambda,2}$ := PROOF-DL-KNOW($U_\lambda, g, s_\lambda + r_\lambda$) |
| 6 | Compute the proof $\Pi_\lambda := \Pi_{\lambda,1} \| \Pi_{\lambda,2}$ |
| 7 | return $\Pi_\lambda$ |
| 8 | else |
| 9 | Let v be an internal node with children $v_1$ and $v_2$ |
| 10 | Let $C_{v_1}$ and $C_{v_2}$ be the encryptions at $v_1$ and $v_2$, respectively |
| 11 | $\Pi_1$ := Prove($v_1, C_{v_1}$); $\Pi_2$ := Prove($v_2, C_{v_2}$) |
| 12 | Compute $\Pi_v := \Pi_{\lambda,1} \| \Pi_{\lambda,2}$ |
| 13 | return $\Pi_{\lambda,1} \| \Pi_{\lambda,2}$ |
| 14 | end if |
| 15 | end function |
| 16 | $\Pi_{root}$ := Prove(root) |

The function Prove starts at line 1 and generates a proof at every node in the policy tree P that the encryption at the node (as constructed using the algorithm in Table III) complies with the key recovery policy and the protected key remains protected in accordance with the key recovery policy. The function Prove is invoked at line 16 with the node corresponding to protected key 114, shown as root in Table IV, and returns the proof that the policy tree P complies with the key recovery policy and the protected key remains protected in accordance with the key recovery policy.

For the function Prove invoked with a node v and an encryption $C_v$ for the node v (as constructed using the algorithm in Table III), at line 2 a check is made as to whether the current node v is a leaf $\lambda$. If the current node v is a leaf $\lambda$, then at line 3 the triple $C_\lambda := (U_\lambda, V_\lambda, W_\lambda)$ is the encryption at leaf $\lambda$ as discussed above. At line 4 a value $\Pi_{\lambda,1}$ is generated using a function PROOF-DL-EQUAL to prove that Y and $X_\lambda$ are raised to the same random power $r_\lambda$. The function PROOF-DL-EQUAL is discussed in more detail below with reference to Table VIII. At line 5 a value $\Pi_{\lambda,2}$ is generated using a function PROOF-DL-KNOW to prove the knowledge of the discrete log of $U_\lambda$ (which is $s_\lambda + r_\lambda$). Implicitly, the shared secret $K_\lambda$ at this leaf $\lambda$ is $g^{s_\lambda}$. The function PROOF-DL-KNOW is discussed in more detail below with reference to Table VI. At line 6, the proof $\Pi_\lambda$ is computed by concatenating the proofs $\Pi_{\lambda,1}$ and $\Pi_{\lambda,2}$. At line 7 the proof $\Pi_\lambda$ is returned.

At lines 8 and 9, if v is not a leaf node, then v is an internal node with children $v_1$ and $v_2$. At line 10, $C_{v_1}$ and $C_{v_2}$ are the encryptions at $v_1$ and $v_2$, respectively. At line 11, the function Prove is called to recursively generate proofs for the subtree rooted at $v_1$ and having encryption $C_{v_1}$, and the subtree rooted at $v_2$ and having encryption $C_{v_2}$. At line 12, the proof $\Pi_\lambda$ for this internal node v is computed by concatenating the proofs for the children nodes of node v (the nodes below node v), which are $\Pi_{\lambda,1}$ and $\Pi_{\lambda,2}$. At line 7 the concatenated proofs for the children nodes of v are returned.

At lines 14 and 15 the function Prove ends.

The client device sends to the service 104 of FIG. 1 for storage the encryption $C_{root}$, the signature sig on the encryption $C_{root}$, and the NIZK proof $\Pi_{root}$. The adherence of these data to the key recovery policy (the policy tree P) can subsequently be verified by any entity with access to the signature verification key S of the client device.

Table V below illustrates an example of verifying a proof $\Pi_{root}$ for a policy tree P. Although a particular algorithm is illustrated in Table V, it should be noted that the algorithm shown in Table V is only an example and that various other algorithms can alternatively be used to verify a proof for policy tree P. The algorithm in Table V assumes that the encryption $C_{root}$ of the policy tree P, the signature sig on the encryption $C_{root}$, and the proof $\Pi_{root}$ for the policy tree P have been constructed as discussed above with respect to the algorithms in Tables III and IV.

TABLE V

| Line | Description |
|------|-------------|
| 1 | function Verify(v, $C_v$) |
| 2 | if v is a leaf $\lambda$ then |
| 3 | Let $\Pi_\lambda$ be the proof at $\lambda$ |
| 4 | check1 := VERIFY-DL-EQUAL($\Pi_\lambda, W_\lambda, X_\lambda, V_\lambda, Y$) |
| 5 | check2 := VERIFY-DL-KNOW($\Pi_\lambda, U_\lambda, g$) |
| 6 | return check1 && check2 |
| 7 | else if v is an internal node computing AND with children $v_1$ and $v_2$ then |
| 8 | if (Verify($v_1$) && Verify ($v_2$)) then |
| 9 | Let $C_v$, $C_{v_1}$, and $C_{v_2}$ be the ciphertexts at v, $v_1$, $v_2$, respectively |
| 10 | check1 := ($U_v == U_{v_1} \cdot U_{v_2}$) |
| 11 | check2 := ($V_v == V_{v_1} \cdot V_{v_2}$) |
| 12 | return check1 && check2 |
| 13 | else |
| 14 | return false |
| 15 | end if |
| 16 | else if v is an internal node computing OR with children $v_1$ and $v_2$ then |
| 17 | if (Verify($v_1$) && Verify ($v_2$)) then |
| 18 | Let $C_v$, $C_{v_1}$, and $C_{v_2}$ be the ciphertexts at v, $v_1$, $v_2$, respectively |
| 19 | check1 := ($U_{v_1} == U_{v_2}$) && ($U_v == U_{v_2}$) |
| 20 | check2 := ($V_{v_1} == V_{v_2}$) && ($V_v == V_{v_2}$) |
| 21 | return check1 && check2 |
| 22 | else |
| 23 | return false |
| 24 | end if |
| 25 | end if |
| 26 | end function |
| 27 | verif := CheckSign(S, $C_{root}$, sig) && Verify(root) |

The function Verify starts at line 1 and returns an indication of whether the verification of the proof $\Pi_{root}$ succeeds. The function Verify is invoked at line 27 with the node corresponding to protected key 114, shown as root in Table V, and returns a value of True if the verification of the proof $\Pi_{root}$ succeeds, and a value of false otherwise.

For the function Verify invoked with a node v and an encryption $C_v$ for the node v (as constructed using the algorithm in Table III), at line 2 a check is made as to whether the current node v is a leaf $\lambda$. If the current node v is a leaf $\lambda$, then at line 3 $\Pi_\lambda$ is the proof at $\lambda$ (as constructed using the algorithm in Table IV). At line 4 a value check1 is generated using a function VERIFY-DL-EQUAL to verify that there is a value d such that $W_\lambda = X_\lambda^d$ and $V_\lambda = Y^d$, and d is $r_\lambda$. The function VERIFY-DL-EQUAL returns a value of true if the verification is made and a value of false if the verification is not made, as discussed in more detail below with reference to Table IX. At line 5 a value check2 is generated using a function VERIFY-DL-KNOW to verify the knowledge of D LOG($U_\lambda, g$), which is $s_\lambda + r_\lambda$. Implicitly, D LOG($K_\lambda, g$)=D LOG($U_\lambda, g$)–D LOG($v_\lambda, Y$). The function VERIFY-DL-KNOW returns a value of true if the verification is made and a value of false if the verification is not made, as discussed in more detail below with reference to Table VII. At line 6, a value of true is returned if both check1 and check2 are true, and otherwise a value of false is returned.

At line 7, if v is an internal node (not a leaf node) with children $v_1$ and $v_2$ logically AND'd, then at line 8 the function Verify is called to recursively verify both the subtree rooted at $v_1$ and the subtree rooted at $v_2$. If the function Verify returns true for both the subtree rooted at $v_1$ and the subtree rooted at $v_2$, then at line 9 $C_v$, $C_{v_1}$ and $C_{v_2}$ are the ciphertexts at v, $v_1$ and $v_2$, respectively. At line 10 a value check1 is set equal to true if the secrets are the same (the secrets at the current node equals the product of the secrets at the children nodes), and false otherwise. At line 11, a value check2 is set equal to true if the randomness are the same (the randomness at the current node equals the product of the randomness at the children nodes), and false otherwise. At line 12, a value of true is returned if both check1 and check2 are true, and otherwise a value of false is returned.

If the function Verify does not return true for both the subtree rooted at $v_1$ and the subtree rooted at $v_2$ in line 8, then at line 14 a value of false is returned.

At line 16, if v is an internal node (not a leaf node) with children $v_1$ and $v_2$ logically OR'd, then at line 17 the function Verify is called to recursively verify both the subtree rooted at $v_1$ and the subtree rooted at $v_2$. If the function Verify returns true for both the subtree rooted at $v_1$ and the subtree rooted at $v_2$, then at line 18 $C_v$, $C_{v_1}$ and $C_{v_2}$ are the ciphertexts at v, $v_1$ and $v_2$, respectively. At line 19 a value check1 is set equal to true if the secrets at the current node and its children nodes are the same, and false otherwise. At line 20, a value check2 is set equal to true if the randomness at the current node and its children nodes is the same, and false otherwise. At line 21, a value of true is returned if both check1 and check2 are true, and otherwise a value of false is returned.

If the function Verify does not return true for both the subtree rooted at $v_1$ and the subtree rooted at $v_2$ in line 18, then at line 23 a value of false is returned.

At lines 24, 25, and 26 the function Prove ends.

At line 27, a value verif is returned as true if the function Verify called on root returns true and the function CheckSig for the signature on sig is verified (returns true), and otherwise returns false.

The functions PROOF-DL-KNOW, VERIFY-DL-KNOW, PROOF-DL-EQUAL, and VERIFY-DL-EQUAL are discussed above. These functions are discussed in more detail as follows. In the discussion of these functions, it is assumed the functions have access to a hash function h giving outputs in a number space $\mathbb{Z}_q^*$ (e.g., integer outputs).

Table VI below illustrates an example of generating proof of knowledge of a logarithm. Although a particular algorithm is illustrated in Table VI, it should be noted that the algorithm shown in Table VI is only an example and that various other algorithms can alternatively be used to generate proof of knowledge of a logarithm.

TABLE VI

| Line | Description |
| --- | --- |
| 1 | function PROOF-DL-KNOW(X, P, r) |
| 2 | Let $s \xleftarrow{\$} \mathbb{Z}_q^*$, A := $P^s$ |
| 3 | Let l = h(X, P, A) |
| 4 | Let d = s + rl |
| 5 | return (A, d) |
| 6 | end function |

The function PROOF-DL-KNOW receives inputs of X, P, and r, where $X=P^r$. The values A and d are calculated and returned as shown at lines 2-5 to prove that the r such that where $X=P^r$ is known.

Table VII below illustrates an example of verifying proof of knowledge of a logarithm. Although a particular algorithm is illustrated in Table VII, it should be noted that the algorithm shown in Table VII is only an example and that various other algorithms can alternatively be used to verify proof of knowledge of a logarithm.

TABLE VII

| Line | Description |
| --- | --- |
| 1 | function VERIFY-DL-KNOW(X, P, (A, d)) |
| 2 | Let l = h(X, P, A) |
| 3 | return ($P^d == A \cdot X^l$) |
| 4 | end function |

The function VERIFY-DL-KNOW receives inputs of X, P, and (A, d), and returns a value of true to indicate verification of knowledge of the logarithm, and false to indicate non-verification of knowledge of the logarithm. The value (A, d) is a proof of knowledge of r=D $LOG_P(X)$ obtained using the algorithm of Table VI.

With reference to the algorithms in Tables VI and VII, if the calls to h are replaced by an interactive protocol, then this process is Zero-Knowledge because the transcript of such a run of the protocol consists of the tuple (X, P, A, l, d), such that $P^d = A \cdot X^l$, and the values of A and l being uniformly distributed. Such a distribution can be sampled without knowledge of r, by selecting d and l uniformly at random and taking $A = P^d \cdot X^{-l}$. After the prover has fixed X and A, the verifier emits the challenge l. Since the prover must be able to supply a correct value of d with non-trivial probability, the prover must be able to provide a correct value of d for two distinct values of l. But this allows the recovery of s and r by linear algebra, and hence the prover is able to compute r.

Table VIII below illustrates an example of generating proof of knowledge of the equality of two logarithms. Although a particular algorithm is illustrated in Table VIII, it should be noted that the algorithm shown in Table VIII is only an example and that various other algorithms can alternatively be used to generate proof of knowledge of the equality of two logarithms.

TABLE VIII

| Line | Description |
| --- | --- |
| 1 | function PROOF-DL-EQUAL(X, P, Y, Q, r) |
| 2 | Let $s \xleftarrow{\$} \mathbb{Z}_q^*$, A := $P^s$; B := $Q^s$ |
| 3 | Let l = h(X, P, A, Y, Q, B) |
| 4 | Let d = s + rl |
| 5 | return (A, B, d) |
| 6 | end function |

The function PROOF-DL-EQUAL receives inputs of X, P, Y, Q, and r, where $X=P^r$. The values A, B, and d are calculated and returned as shown at lines 2-5 to prove that the r such that where $X=P^r$ and $Y=Q^r$ is known.

Table IX below illustrates an example of verifying proof of the equality of two logarithms. Although a particular algorithm is illustrated in Table IX, it should be noted that the algorithm shown in Table IX is only an example and that various other algorithms can alternatively be used to verify proof of the equality of two logarithms.

TABLE IX

| Line | Description |
|---|---|
| 1 | function VERIFY-DL-EQUAL(X, P, Y, Q, (A, B, d)) |
| 2 | Let l = h(X, P, A, Y, Q, B) |
| 3 | return ($P^d$ == A•$X^l$) && ($Q^d$ == B•$Y^l$) ( ) |
| 4 | end function |

The function VERIFY-DL-EQUAL receives inputs of X, P, Y, Q, and (A, B, d), and returns a value of true to indicate verification of knowledge of the equality of two logarithms, and false to indicate non-verification of knowledge of the equality of two logarithms. The value (A, d) is a proof of knowledge of r=D $LOG_p$(X) obtained using the algorithm of Table VIII.

With reference to the algorithms in Tables VIII and IX, if the calls to h are replaced by an interactive protocol, then this process is Zero-Knowledge because the transcript of such a run of the protocol consists of the tuple (X, P, Y, Q, A, B, l, d), such that $P^d$=A·$X^l$, $Q^d$=B·$Y^l$, and the values of A, B, and l being uniformly distributed. Such a distribution can be sampled without knowledge of r, by selecting d and l uniformly at random and taking A=$P^d$·$X^{-1}$ and B=$Q^d$·$Y^{-1}$. After the prover has fixed X, Y, A, and B, the verifier emits the challenge l. Since the prover must be able to supply a correct value of d with non-trivial probability, the prover must be able to provide a correct value of d for two distinct values of l. But this allows the recovery of s and r by linear algebra, and hence the prover is able to compute r. In particular, this implies that D $LOG_p$(X)=D $LOG_Q$(X).

As discussed above, two different schemes for generating proofs are discussed. The second scheme that uses uncorrelated randomness by fixing a child of each OR gate to propagate the encryption is discussed in the following, with reference to Table X and Table XI. The randomness among the children of the OR gate can be chosen independently.

Discussing the second scheme using randomness by fixing a child of each OR gate to propagate the encryption, the proof generation module 208 has a public/private key pair. Similar to the first scheme discussed above, this public/private key pair is discussed below as S (upper case) for the public key and s (lower case) for the private key. This public/private key pair and be a public/private key pair of the client device 102, or a public/private key pair for just the proof generation module 208. The proof generation module 208 also has access to a function sig=Sign(s, message) that generates a digital signature sig using the private key s for any data given as message, and a function CheckSign(S, sig, message) that verifies a digital signature sig using the public key S for any data given as message. The Sign and CheckSign functions can be implemented on the client device 102 or alternatively on another device or service.

In the discussions of the first scheme below, it is assumed that the shares of a protected key K have been generated according to the policy tree P. For each leaf λ (which can also be referred to as the leaf agent or leaf node in the policy tree) of the policy tree P, the corresponding share is referred to as $K_λ$. The value $X_λ$ refers to the public key for the leaf λ. The secret key $x_λ$ is privately held by the leaf λ (or device associated with the leaf agent). The proof generation module 208 chooses (randomly or pseudorandomly) a secret y and computes the corresponding public key Y as Y:=$g^y$. The proof generation module 208 also chooses (randomly or pseudorandomly) a random $r_λ$ for each leaf λ of the policy tree P. In contrast to the first scheme discussed above, in the second scheme the proof generation module 208 does not need to distribute randomness top-down on the policy tree P using (additively) secret sharing. Instead, the randomness propagates bottom-up along with the encryptions.

Table X below illustrates an example of generating a proof for a policy tree P. Although a particular algorithm is illustrated in Table X, it should be noted that the algorithm shown in Table X is only an example and that various other algorithms can alternatively be used to generate the proofs for policy tree P.

TABLE X

| Line | Description |
|---|---|
| 1 | function Prove(v, $C_v$) |
| 2 | if v is a leaf λ then |
| 3 | Let $C_λ$ := ($U_λ$, $V_λ$, $W_λ$) be encryption at λ |
| 4 | Generate $Π_λ$ := PROOF-DL-EQUAL($W_λ$, $X_λ$, $V_λ$, Y, $r_λ$) |
| 5 | return $Π_λ$ |
| 6 | else if v is an internal node computing AND with children $v_1$ and $v_2$ then |
| 7 | $Π_1$ := Prove($v_1$, $C_{v_1}$); $Π_2$ := Prove($v_2$, $C_{v_2}$) |
| 8 | return $Π_1$ ∥ $Π_2$ |
| 9 | else if v is an internal node computing OR with children $v_1$ and $v_2$ then |
| 10 | $Π_1$ := Prove($v_1$, $C_{v_1}$); $Π_2$ := Prove($v_2$, $C_{v_2}$) |
| 11 | Generate $Π_v$ := PROOF-DL-EQUAL($U_{v_1}$ $U_{v_2}^{-1}$, g, $V_{v_1}$ $V_{v_2}^{-1}$, Y, $r_{v_1}$ − $r_{v_2}$) |
| 12 | return $Π_v$ ∥ $Π_1$ ∥ $Π_2$ |
| 13 | end if |
| 14 | end function |
| 15 | $Π_{root}$ := Prove(root) |

The function Prove for the second scheme starts at line 1 and generates a proof at every node in the policy tree P that the encryption at the node (as constructed using the algorithm in Table III) complies with the key recovery policy and the protected key remains protected in accordance with the key recovery policy. The function Prove is invoked at line 15 with the node corresponding to protected key 114, shown as root in Table X, and returns the proof that the policy tree P complies with the key recovery policy and the protected key remains protected in accordance with the key recovery policy.

For the function Prove invoked with a node v and an encryption $C_v$ for the node v (as constructed using the algorithm in Table III), at line 2 a check is made as to whether the current node v is a leaf λ. If the current node v is a leaf λ, then at line 3 the triple $C_λ$:=($U_λ$, $V_λ$, $W_λ$) is the encryption at leaf λ as discussed above. At line 4 a value $Π_λ$ is generated using a function PROOF-DL-EQUAL, as discussed above, to prove that Y and $X_λ$ are raised to the same random power $r_λ$. At line 5 the proof $Π_λ$ is returned.

At line 6, if v is an internal node (not a leaf node) with children $v_1$ and $v_2$ logically AND'd, then at line 7 the function Prove is called to recursively generate proofs for the subtree rooted at $v_1$ and having encryption $C_{v_1}$, and the subtree rooted at $v_2$ and having encryption $C_{v_2}$. $C_{v_1}$ and $C_{v_2}$ are the encryptions at $v_1$ and $v_2$, respectively. At line 8 the concatenated proofs for the children nodes of v are returned.

At line 9, if v is an internal node (not a leaf node) with children $v_1$ and $v_2$ logically OR'd, then at line 10 the function Prove is called to recursively generate proofs for the subtree rooted at $v_1$ and having encryption $C_{v_1}$, and the subtree rooted at $v_2$ and having encryption $C_{v_2}$. $C_{v_1}$ and $C_{v_2}$ are the encryptions at $v_1$ and $v_2$, respectively. At line 11 a value $Π_v$ is generated using a function PROOF-DL-EQUAL, as discussed above, to prove that $v_1$ and $v_2$ encode the same message. At line 12 the concatenated proofs for the current node v and the children nodes of v are returned.

At lines 13 and 14 the function Prove ends.

The client device sends to the service 104 of FIG. 1 for storage the encryption $C_{root}$, the signature sig on the encryption $C_{root}$, and the NIZK proof $\Pi_{root}$. The adherence of these data to the key recovery policy (the policy tree P) can subsequently be verified by any entity with access to the signature verification key S of the client device.

Table XI below illustrates an example of verifying a proof $\Pi_{root}$ for a policy tree P. Although a particular algorithm is illustrated in Table XI, it should be noted that the algorithm shown in Table XI is only an example and that various other algorithms can alternatively be used to verify a proof for policy tree P. The algorithm in Table XI assumes that the encryption $C_{root}$ of the policy tree P, the signature sig on the encryption $C_{root}$, and the proof $\Pi_{root}$ for the policy tree P have been constructed as discussed above with respect to the algorithms in Tables III and IV.

TABLE XI

| Line | Description |
| --- | --- |
| 1 | function Verify(v, $C_v$) |
| 2 | if v is a leaf λ then |
| 3 | Let $\Pi_\lambda$ be the proof at λ |
| 4 | check1 := VERIFY-DL-EQUAL($\Pi_\lambda$, $W_\lambda$, $X_\lambda$, $V_\lambda$, Y) |
| 5 | return check1 |
| 6 | else if v is an internal node computing AND with children $v_1$ and $v_2$ then |
| 7 | if (Verify($v_1$, $C_{v_1}$) && Verify ($v_2$, $C_{v_2}$)) then |
| 8 | Let $C_v$, $C_{v_1}$, and $C_{v_2}$ be the ciphertexts at v, $v_1$, $v_2$, respectively |
| 9 | check1 := ($U_v == U_{v_1} \cdot U_{v_2}$) |
| 10 | check2 := ($V_v == V_{v_1} \cdot V_{v_2}$) |
| 11 | return check1 && check2 |
| 12 | else |
| 13 | return false |
| 14 | end if |
| 15 | else if v is an internal node computing OR with children $v_1$ and $v_2$ then |
| 16 | if (Verify($v_1$, $C_{v_1}$) && Verify ($v_2$, $C_{v_2}$)) then |
| 17 | Let $C_v$, $C_{v_1}$, and $C_{v_2}$ be the ciphertexts at v, $v_1$, $v_2$, respectively |
| 18 | check1 := ($U_{v_1} == U_{v_2}$) && ($U_v == U_{v_2}$) |
| 19 | check2 := ($V_{v_1} == V_{v_2}$) && ($V_v == V_{v_2}$) |
| 20 | check3 := VERIFY-DL-EQUAL($\Pi_\lambda$, $U_{v_1} U_{v_2}^{-1}$, g, $V_{v_1} V_{v_2}^{-1}$, Y) |
| 21 | return check1 && check2 && check3 |
| 22 | else |
| 23 | return false |
| 24 | end if |
| 25 | end if |
| 26 | end function |
| 27 | verif := CheckSign(S, $C_{root}$, sig) && Verify(root) |

The function Verify for the second scheme starts at line 1 and returns an indication of whether the verification of the proof $\Pi_{root}$ succeeds. The function Verify is invoked at line 27 with the node corresponding to protected key 114, shown as root in Table XI, and returns a value of True if the verification of the proof $\Pi_{root}$ succeeds, and a value of false otherwise.

For the function Verify invoked with a node v and an encryption $C_v$ for the node v (as constructed using the algorithm in Table III), at line 2 a check is made as to whether the current node v is a leaf λ. If the current node v is a leaf λ, then at line 3 $\Pi_\lambda$ is the proof at λ (as constructed using the algorithm in Table IV). At line 4 a value check1 is generated using a function VERIFY-DL-EQUAL to verify that there is a value d such that $W_\lambda = X_\lambda^d$ and $V_\lambda = Y^d$, and d is $r_\lambda$. The function VERIFY-DL-EQUAL returns a value of true if the verification is made and a value of false if the verification is not made, as discussed above with reference to Table IX. At line 5, the value check1 is returned.

At line 6, if v is an internal node (not a leaf node) with children $v_1$ and $v_2$ logically AND'd, then at line 7 the function Verify is called to recursively verify both the subtree rooted at $v_1$ and having encryption $C_{v_1}$, and the subtree rooted at $v_2$ and having encryption $C_{v_2}$. As indicated at line 8, $C_v$, $C_{v_1}$ and $C_{v_2}$ are the ciphertexts at v, $v_1$ and $v_2$, respectively. At line 9 a value check1 is set equal to true if the secrets are the same (the secrets at the current node equals the product of the secrets at the children nodes), and false otherwise. At line 10, a value check2 is set equal to true if the randomness are the same (the randomness at the current node equals the product of the randomness at the children nodes), and false otherwise. At line 12, a value of true is returned if both check1 and check2 are true, and otherwise a value of false is returned.

If the function Verify does not return true for both the subtree rooted at $v_1$ and the subtree rooted at $v_2$ in line 7, then at line 13 a value of false is returned.

At line 15, if v is an internal node (not a leaf node) with children $v_1$ and $v_2$ logically OR'd, then at line 16 the function Verify is called to recursively verify both the subtree rooted at $v_1$ and having encryption $C_{v_1}$, and the subtree rooted at $v_2$ and having encryption $C_{v_2}$. If the function Verify returns true for both the subtree rooted at $v_1$ and the subtree rooted at $v_2$, then as indicated at line 17, $C_v$, $C_{v_1}$ and $C_{v_2}$ are the ciphertexts at v, $v_1$ and $v_2$, respectively. At line 18 a value check1 is set equal to true if the secrets at the current node and its children nodes are the same, and false otherwise. At line 19, a value check2 is set equal to true if the randomness at the current node and its children nodes is the same, and false otherwise. At line 20, a value check3 is generated using a function VERIFY-DL-EQUAL to verify that the two children nodes encode the same message. The function VERIFY-DL-EQUAL returns a value of true if the verification is made and a value of false if the verification is not made, as discussed above with reference to Table IX. At line 21, a value of true is returned if check1, check2, and check3 are all true, and otherwise a value of false is returned.

If the function Verify does not return true for both the subtree rooted at $v_1$ and the subtree rooted at $v_2$ in line 17, then at line 23 a value of false is returned.

At lines 24, 25, and 26 the function Prove ends.

At line 27, a value verif is returned as true if the function Verify called on root returns true and the function CheckSig for the signature on sig is verified (returns true), and otherwise returns false.

Figure 5:
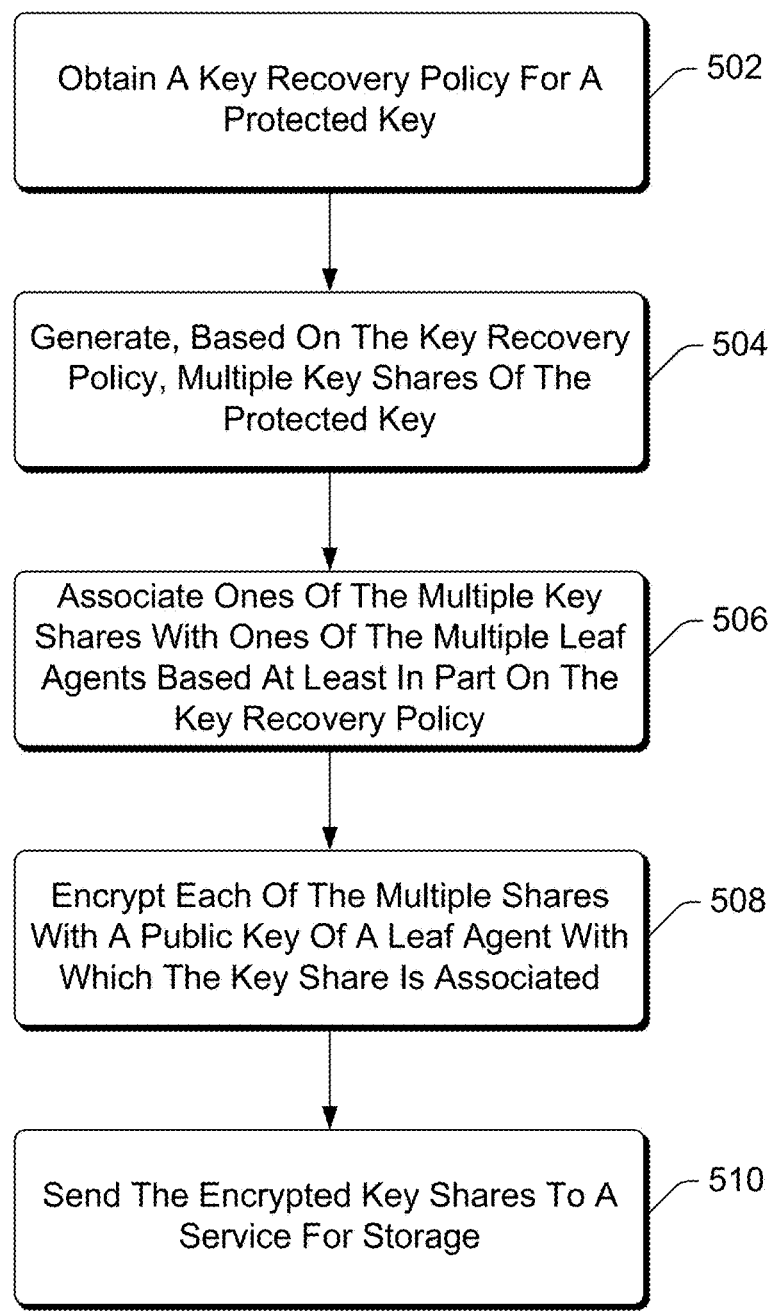
FIG. 5 is a flowchart illustrating an example process for implementing the policy-based key recovery in accordance with one or more embodiments.

FIG. 5 is a flowchart illustrating an example process 500 for implementing the policy-based key recovery in accordance with one or more embodiments. Process 500 is carried out by a device, such as client device 102 of FIG. 1 or FIG. 2, and can be implemented in software, firmware, hardware, or combinations thereof. Process 500 is shown as a set of acts and is not limited to the order shown for performing the operations of the various acts. Process 500 is an example process for implementing the policy-based key recovery; additional discussions of implementing the policy-based key recovery are included herein with reference to different figures.

In process 500, a key recovery policy for a protected key is obtained (act 502). The key recovery policy can be obtained in various manners as discussed above, such as from a remote device or service, from a user of the device implementing process 500, and so forth.

Multiple key shares of the protected key are generated base on the key recovery policy (act 504). These key shares can be generated in various different manners as discussed above, and are generated so that the protected key can be recovered given an appropriate combination of leaf agents (as indicated by the key recovery policy).

Ones of the multiple key shares are associated with ones of the multiple leaf agents based at least in part on the key recovery policy (act 506). Which key shares are associated with which leaf agents varies based on the key recovery policy and the combinatorial logic used to describe which combinations of leaf agents can be used to recover the protected key, as discussed above.

Each of the multiple key shares is encrypted with a public key of a public/private key pair of a leaf agent with which the key share is associated (act 508). This allows the leaf agent with which a key share is associated to decrypt the encrypted key share, but prevents others from decrypting the encrypted key share.

The encrypted key shares are sent to a service for storage (act 510). The encrypted key shares can be sent to the service in any of a variety of manners, such as via the Internet or other network. The key recovery policy can also optionally be sent to the service for storage, allowing the protected key to be recovered even if the client device that implements process 500 is no longer available.

Figure 6:
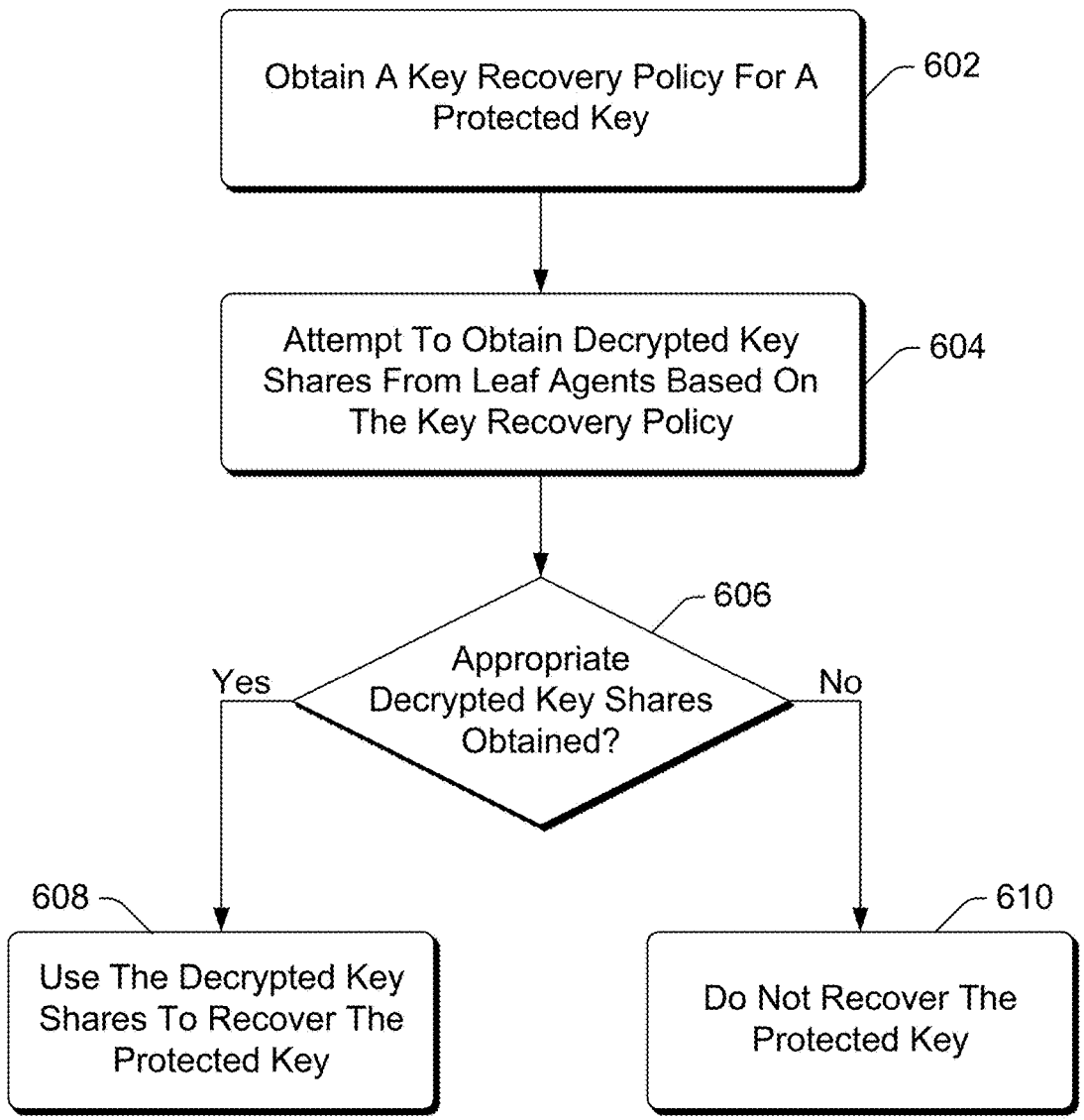
FIG. 6 is a flowchart illustrating an example process for recovering a protected key in accordance with one or more embodiments.

FIG. 6 is a flowchart illustrating an example process 600 for recovering a protected key in accordance with one or more embodiments. Process 600 is carried out by a device, such as recovering authority device 108 of FIG. 1, and can be implemented in software, firmware, hardware, or combinations thereof. Process 600 is shown as a set of acts and is not limited to the order shown for performing the operations of the various acts. Process 600 is an example process for recovering a protected key; additional discussions of recovering a protected key are included herein with reference to different figures.

In process 600, a key recovery policy for a protected key is obtained (act 602). The key recovery policy can be obtained in various manners, such as from a remote device or service, from the client device, and so forth.

An attempt is made to obtain decrypted key shares for the protected key from the leaf agents based on the key recovery policy (act 604). Various different combinations of leaf agents can provide decrypted key shares allowing the protected key to be decrypted as discussed above, and an attempt is made to obtain the decrypted key shares from at least one combination of leaf agents that will allow the protected key to be decrypted. Each leaf agent itself determines whether to provide its decrypted key share to the device implementing process 600.

Process 600 then proceeds based on whether the appropriate decrypted key shares are obtained (act 606). If decrypted key shares are obtained from at least one combination of leaf agents that the key recovery policy indicates can be used to recover the protected key, then it is determined that the appropriate key shares are obtained. However, if decrypted key shares are not obtained from at least one combination of leaf agents that the key recovery policy indicates can be used to recover the protected key, then it is determined that the appropriate key shares are not obtained.

If the appropriate decrypted key shares are obtained, then the decrypted key shares are used to recover the protected key (act 608). The key recovery policy indicates how to recover the protected key given the decrypted key shares, as discussed above. However, if the appropriate key shares are not obtained, then the protected key is not recovered (act 610).

Figure 7:
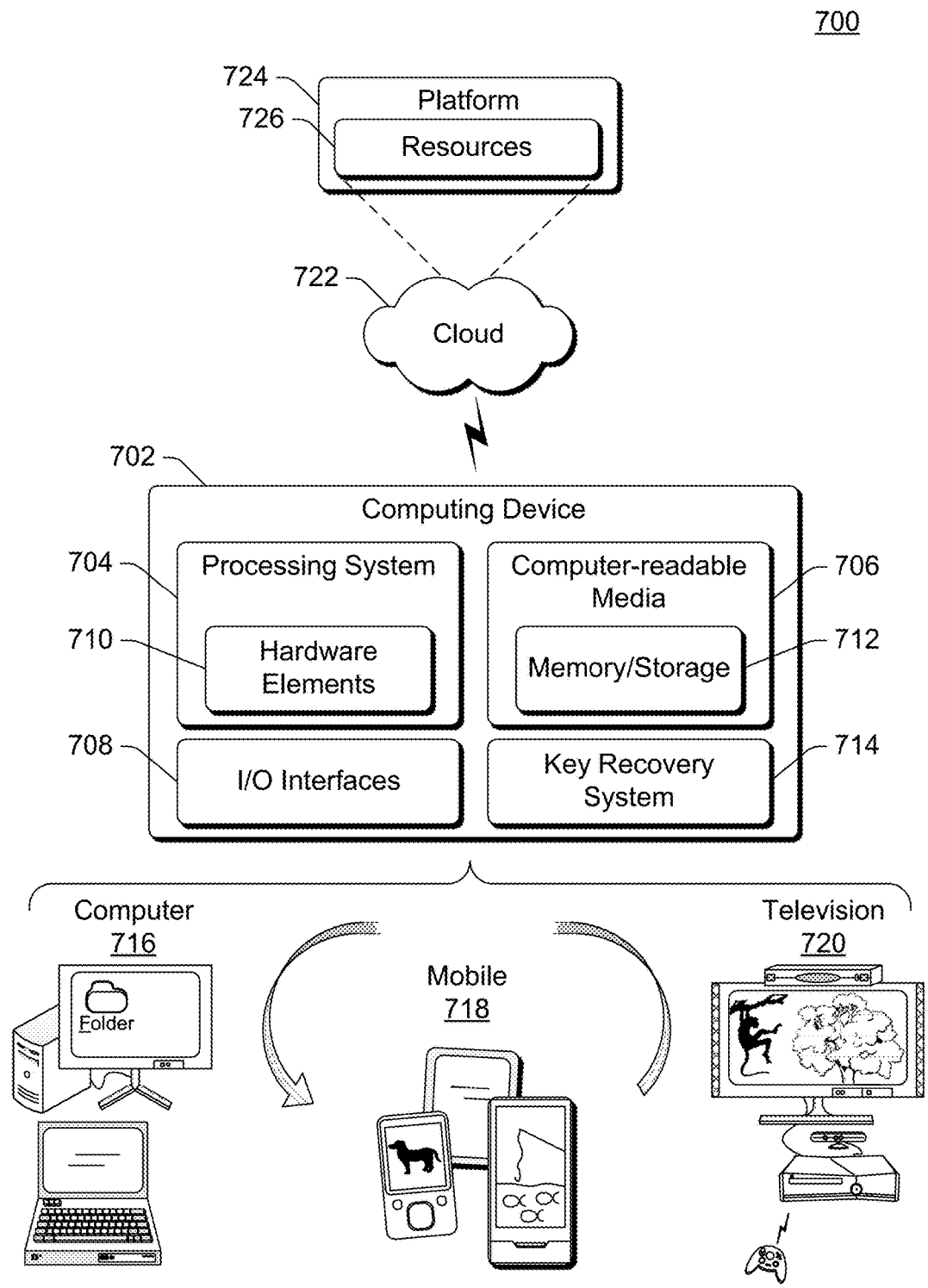
FIG. 7 illustrates an example system that includes an example computing device that is representative of one or more systems and/or devices that may implement the various techniques described herein.

FIG. 7 illustrates an example system generally at 700 that includes an example computing device 702 that is representative of one or more systems and/or devices that may implement the various techniques described herein. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O Interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Resistive RAM (ReRAM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

The one or more input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 702 may be configured in a variety of ways as further described below to support user interaction.

The computing device 702 also includes a key recovery system 714. The key recovery system 714 provides various functionality for protecting and recovery keys based on a key recovery policy, as discussed above. The key recovery system 714 can implement, for example, modules and components of the client device 102 of FIG. 1, modules and components of the recovering authority device 108 of FIG. 1, modules and components of a leaf agent device 106 of FIG. 1, or modules and components of the service 104 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 710 and computer-readable media 706 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of modules as a module that is executable by the computing device 702 as software may be achieved at least partially in hardware, e.g., through use of computer-readable storage media and/or hardware elements 710 of the processing system. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 702 may assume a variety of different configurations, such as for computer 716, mobile 718, and television 720 uses. Each of these configurations includes devices that may have generally different constructs and capabilities, and thus the computing device 702 may be configured according to one or more of the different device classes. For instance, the computing device 702 may be implemented as the computer 716 class of a device that includes a personal computer, desktop computer, a multi-screen computer, laptop computer, netbook, and so on.

The computing device 702 may also be implemented as the mobile 718 class of device that includes mobile devices, such as a mobile phone, portable music player, portable gaming device, a tablet computer, a multi-screen computer, and so on. The computing device 702 may also be implemented as the television 720 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. This functionality may also be implemented all or in part through use of a distributed system, such as over a "cloud" 722 via a platform 724 as described below.

The cloud 722 includes and/or is representative of a platform 724 for resources 726. The platform 724 abstracts underlying functionality of hardware (e.g., servers) and software resources of the cloud 722. The resources 726 may include applications and/or data that can be utilized while computer processing is executed on servers that are remote from the computing device 702. Resources 726 can also include services provided over the Internet and/or through a subscriber network, such as a cellular or Wi-Fi network.

The platform 724 may abstract resources and functions to connect the computing device 702 with other computing devices. The platform 724 may also serve to abstract scaling of resources to provide a corresponding level of scale to encountered demand for the resources 726 that are implemented via the platform 724. Accordingly, in an interconnected device embodiment, implementation of functionality described herein may be distributed throughout the system 700. For example, the functionality may be implemented in part on the computing device 702 as well as via the platform 724 that abstracts the functionality of the cloud 722.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method comprising: obtaining a key recovery policy for a protected key, the key recovery policy specifying a set of possible combinations of multiple leaf agents that can assist in recovering the protected key; generating, based on the key recovery policy, multiple key shares of the protected key; associating ones of the multiple key shares with ones of the multiple leaf agents based at least in part on the key recovery policy; encrypting each of the multiple shares of the key with a public key of a public/private key pair of the leaf agent with which the key share is associated; and sending the encrypted key shares to a service for storage.

Alternatively or in addition to any of the methods or devices described herein, any one or combination of: the key recovery policy indicating, using combinatorial logic, which combinations of the multiple leaf agents can, by providing their respective key shares, allow the protected key to be recovered; the associating ones of the multiple key shares with ones of the multiple leaf agents comprising identifying a node in a policy tree, the node being either the protected key or an internal node, determining whether two leaf agents that make up the node are combined using a logical AND operation or a logical OR operation, in response to the two leaf agents being combined using the logical OR operation, providing a same key share of the protected key to each of the two leaf agents, and in response to the two leaf agents being combined using the logic AND operation generating two key shares that can be multiplied together to generate the protected key, the two key shares being generated from the protected key or key share associated with the node, associating a first key share of the two key shares with a first leaf agent of the two leaf agents, and associating a second key share of the two key shares with a second leaf agent of the two leaf agents; the associating ones of the multiple key shares with ones of the multiple leaf agents comprising identifying a node in a policy tree, the node being either the protected key or an internal node, determining whether two leaf agents that make up the node are combined using a logical AND operation or a logical OR operation, in response to the two leaf agents being combined using the logical OR operation, providing a same key share of the protected key to each of the two leaf agents, and in response to the two leaf agents being combined using the logic AND operation generating two key shares that can be added together to generate the protected key, the two key shares being generated from the protected key or key share associated with the node, associating a first key share of the two key shares with a first leaf agent of the two leaf agents, and associating a second key share of the two key shares with a second leaf agent of the two leaf agents; the method further comprising sending, to the service for storage, an encryption value for a policy tree representing the key recovery policy, a digital signature generated on the encryption value, and a proof value indicating that each possible combination of the set of possible combinations is able recover the protected key; the method further comprising generating a proof indicating, without revealing the multiple shares of the protected key, that each possible combination of the set of possible combinations is to able recover the protected key; wherein a policy tree represents the key recovery policy, the method further comprising using, in generating the proof, correlated randomness at OR gates in the policy tree; wherein a policy tree represents the key recovery policy, the method further comprising using, in generating the proof, uncorrelated randomness by fixing a child of each OR gate to propagate encryption of the nodes of the policy tree; the method further comprising using a Decisional Diffie-Hellman assumption as a basis for generating the multiple key shares, encrypting each of the multiple shares of the key, and generating the proof.

A method comprising: obtaining a key recovery policy for a protected key, the key recovery policy specifying a set of possible combinations of multiple leaf agents that can assist in recovering the protected key; attempting to obtain decrypted key shares from leaf agents in one or more of the set of possible combinations of leaf agents; and in response to obtaining decrypted key shares from leaf agents in one or more of the set of possible combinations of leaf agents, using the decrypted key shares to recover the protected key.

Alternatively or in addition to any of the methods or devices described herein, any one or combination of: the key recovery policy indicating, using combinatorial logic, which combinations of the multiple leaf agents can, by providing their respective decrypted key shares, allow the protected key to be recovered; the method being implemented in a recovering authority device, the attempting to obtain the decrypted key shares comprising sending, to a leaf agent, a request for the decrypted key share associated with the leaf agent, and receiving, from a leaf agent device associated with the leaf agent, the decrypted key share only if the leaf agent determines it is acceptable for the recovering authority device to recover the protected key; the using the decrypted key shares comprising multiplying together appropriate ones of the decrypted key shares in accordance with the key recovery policy; the decrypted key shares having been generated based on a Decisional Diffie-Hellman assumption.

A device comprising: a processor; and a computer-readable storage medium having stored thereon multiple instructions that, responsive to execution by the processor, cause the processor to: obtain a key recovery policy for a protected key of the device, the key recovery policy specifying a set of combinations of multiple leaf agents that can assist in recovering the protected key; generate, based on the key recovery policy, multiple key shares of the protected key; associate ones of the multiple key shares with ones of the multiple leaf agents based at least in part on the key recovery policy; encrypt each of the multiple shares of the key with a public key of a public/private key pair of the leaf agent with which the key share is associated; and send the encrypted key shares to a service for storage.

Alternatively or in addition to any of the methods or devices described herein, any one or combination of: the multiple instructions further causing the processor to use a Decisional Diffie-Hellman assumption as a basis for generating the multiple key shares and encrypting each of the multiple shares of the key; the key recovery policy indicating, using combinatorial logic, which combinations of the multiple leaf agents can, by providing their respective key shares, allow the protected key to be recovered; the multiple instructions further causing the processor to generate a proof indicating, without revealing the multiple shares of the protected key, that each possible combination of the set of possible combinations is able to recover the protected key; wherein a policy tree represents the key recovery policy, the multiple instructions further causing the processor to use, in generating the proof, correlated randomness at OR gates in the policy tree; wherein a policy tree represents the key recovery policy, the multiple instructions further causing the processor to use, in generating the proof, uncorrelated randomness by fixing a child of each OR gate to propagate encryption of the nodes of the policy tree.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    obtaining a key recovery policy for a protected key, the key recovery policy specifying a set of possible combinations of multiple leaf agents that can assist in recovering the protected key;
    generating, based on the key recovery policy, multiple key shares of the protected key;
    associating ones of the multiple key shares with ones of the multiple leaf agents based at least in part on the key recovery policy;
    encrypting each of the multiple shares of the key with a public key of a public/private key pair of the leaf agent with which the key share is associated; and
    sending the encrypted key shares to a service for storage.

2. The method as recited in claim 1, the key recovery policy indicating, using combinatorial logic, which combinations of the multiple leaf agents can, by providing their respective key shares, allow the protected key to be recovered.

3. The method as recited in claim 1, the associating ones of the multiple key shares with ones of the multiple leaf agents comprising:
    identifying a node in a policy tree, the node being either the protected key or an internal node;
    determining whether two leaf agents that make up the node are combined using a logical AND operation or a logical OR operation;
    in response to the two leaf agents being combined using the logical OR operation, providing a same key share of the protected key to each of the two leaf agents; and
    in response to the two leaf agents being combined using the logic AND operation:
        generating two key shares that can be multiplied together to generate the protected key, the two key shares being generated from the protected key or key share associated with the node;
        associating a first key share of the two key shares with a first leaf agent of the two leaf agents; and
        associating a second key share of the two key shares with a second leaf agent of the two leaf agents.

4. The method as recited in claim 1, the associating ones of the multiple key shares with ones of the multiple leaf agents comprising:
    identifying a node in a policy tree, the node being either the protected key or an internal node;
    determining whether two leaf agents that make up the node are combined using a logical AND operation or a logical OR operation;
    in response to the two leaf agents being combined using the logical OR operation, providing a same key share of the protected key to each of the two leaf agents; and
    in response to the two leaf agents being combined using the logic AND operation:
        generating two key shares that can be added together to generate the protected key, the two key shares being generated from the protected key or key share associated with the node;
        associating a first key share of the two key shares with a first leaf agent of the two leaf agents; and
        associating a second key share of the two key shares with a second leaf agent of the two leaf agents.

5. The method as recited in claim 1, further comprising sending, to the service for storage, an encryption value for a policy tree representing the key recovery policy, a digital signature generated on the encryption value, and a proof value indicating that each possible combination of the set of possible combinations is able recover the protected key.

6. The method as recited in claim 1, further comprising generating a proof indicating, without revealing the multiple shares of the protected key, that each possible combination of the set of possible combinations is to able recover the protected key.

7. The method as recited in claim 6, wherein a policy tree represents the key recovery policy, the method further comprising using, in generating the proof, correlated randomness at OR gates in the policy tree.

8. The method as recited in claim 6, wherein a policy tree represents the key recovery policy, the method further comprising using, in generating the proof, uncorrelated randomness by fixing a child of each OR gate to propagate encryption of the nodes of the policy tree.

9. The method as recited in claim 6, further comprising using a Decisional Diffie-Hellman assumption as a basis for generating the multiple key shares, encrypting each of the multiple shares of the key, and generating the proof.

10. A method comprising:
obtaining a key recovery policy for a protected key, the key recovery policy specifying a set of possible combinations of multiple leaf agents that can assist in recovering the protected key;
attempting to obtain decrypted key shares from leaf agents in one or more of the set of possible combinations of leaf agents; and
in response to obtaining decrypted key shares from leaf agents in one or more of the set of possible combinations of leaf agents, using the decrypted key shares to recover the protected key.

11. The method as recited in claim 10, the key recovery policy indicating, using combinatorial logic, which combinations of the multiple leaf agents can, by providing their respective decrypted key shares, allow the protected key to be recovered.

12. The method as recited in claim 10, the method being implemented in a recovering authority device, the attempting to obtain the decrypted key shares comprising:
sending, to a leaf agent, a request for the decrypted key share associated with the leaf agent; and
receiving, from a leaf agent device associated with the leaf agent, the decrypted key share only if the leaf agent determines it is acceptable for the recovering authority device to recover the protected key.

13. The method as recited in claim 10, the using the decrypted key shares comprising multiplying together appropriate ones of the decrypted key shares in accordance with the key recovery policy.

14. The method as recited in claim 10, the decrypted key shares having been generated based on a Decisional Diffie-Hellman assumption.

15. A device comprising:
a processor; and
a computer-readable storage medium having stored thereon multiple instructions that, responsive to execution by the processor, cause the processor to:
obtain a key recovery policy for a protected key of the device, the key recovery policy specifying a set of combinations of multiple leaf agents that can assist in recovering the protected key;
generate, based on the key recovery policy, multiple key shares of the protected key;
associate ones of the multiple key shares with ones of the multiple leaf agents based at least in part on the key recovery policy;
encrypt each of the multiple shares of the key with a public key of a public/private key pair of the leaf agent with which the key share is associated; and
send the encrypted key shares to a service for storage.

16. The device as recited in claim 15, the multiple instructions further causing the processor to use a Decisional Diffie-Hellman assumption as a basis for generating the multiple key shares and encrypting each of the multiple shares of the key.

17. The device as recited in claim 15, the key recovery policy indicating, using combinatorial logic, which combinations of the multiple leaf agents can, by providing their respective key shares, allow the protected key to be recovered.

18. The device as recited in claim 15, the multiple instructions further causing the processor to generate a proof indicating, without revealing the multiple shares of the protected key, that each possible combination of the set of possible combinations is able to recover the protected key.

19. The device as recited in claim 18, wherein a policy tree represents the key recovery policy, the multiple instructions further causing the processor to use, in generating the proof, correlated randomness at OR gates in the policy tree.

20. The device as recited in claim 18, wherein a policy tree represents the key recovery policy, the multiple instructions further causing the processor to use, in generating the proof, uncorrelated randomness by fixing a child of each OR gate to propagate encryption of the nodes of the policy tree.

* * * * *